(12) United States Patent
Walsh et al.

(10) Patent No.: US 11,698,652 B2
(45) Date of Patent: Jul. 11, 2023

(54) ENERGY CONSERVATION USING ACTIVE DEMAND STABILIZATION

(71) Applicant: CrossnoKaye, Santa Barbara, CA (US)

(72) Inventors: Daniel Walsh, Santa Barbara, CA (US); Jesse Crossno, Santa Barbara, CA (US); Thomas Foley, Goleta, CA (US); Bryan Kaye, Santa Barbara, CA (US)

(73) Assignee: CROSSNO & KAYE, INC, Santa Barbara, CA (US)

( * ) Notice: Subject to any disclaimer, the term of this patent is extended or adjusted under 35 U.S.C. 154(b) by 163 days.

(21) Appl. No.: 16/658,016

(22) Filed: Oct. 18, 2019

(65) Prior Publication Data
US 2021/0116953 A1    Apr. 22, 2021

(51) Int. Cl.
*G05F 1/66* (2006.01)
*H02J 3/00* (2006.01)
*G05B 15/02* (2006.01)
*H02J 3/14* (2006.01)

(52) U.S. Cl.
CPC .............. *G05F 1/66* (2013.01); *G05B 15/02* (2013.01); *H02J 3/007* (2020.01); *H02J 3/14* (2013.01); *G05B 2219/2639* (2013.01); *H02J 2310/52* (2020.01); *H02J 2310/60* (2020.01); *Y02B 70/3225* (2013.01)

(58) Field of Classification Search
None
See application file for complete search history.

(56) References Cited

U.S. PATENT DOCUMENTS

| | | | |
|---|---|---|---|
| 5,984,502 A | 11/1999 | Calder | |
| 2011/0204720 A1* | 8/2011 | Ruiz | B60L 55/00 307/66 |
| 2011/0298596 A1 | 12/2011 | Warrick | |
| 2012/0245744 A1* | 9/2012 | Prosser | H02J 3/46 700/286 |
| 2014/0246909 A1* | 9/2014 | Todorski | H02J 3/14 307/31 |
| 2016/0006245 A1* | 1/2016 | Chow | H02J 3/14 700/291 |
| 2016/0177941 A1 | 6/2016 | Singal et al. | |
| 2016/0274552 A1 | 9/2016 | Strohmenger et al. | |
| 2016/0329706 A1* | 11/2016 | Deligiannis | G05B 13/026 |

(Continued)

OTHER PUBLICATIONS

Coldin et al., Cloud computing for big data analytics in the Process Control Industry, 2017, IEEE, pp. 11 (Year: 2017.

(Continued)

*Primary Examiner* — Sean Shechtman

(57) ABSTRACT

Some embodiments include electric power demand stabilization methods and systems that may include measuring the power draw of a plurality of controllable devices; determining a rolling average power draw for the plurality of controllable devices over a period of time; measuring an instantaneous power draw of the plurality of controllable devices; and calculating a power budget comprising the difference between the instantaneous power draw and the rolling average power draw. In the event the power budget is positive, increasing power to at least a first subset of the plurality of controllable devices. In the event the power budget is negative, decreasing power to at least a second subset of the plurality of controllable devices.

13 Claims, 13 Drawing Sheets

(56) References Cited

U.S. PATENT DOCUMENTS

2018/0024519 A1     1/2018    Peluso et al.
2018/0027071 A1     1/2018    Toepke et al.

OTHER PUBLICATIONS

U.S. Office Action in U.S. Appl. No. 16/428,944, dated Aug. 2, 2019, 13 pgs.
U.S. Notice of Allowance in U.S. Appl. No. 16/428,944, dated Oct. 30, 2019, 8 pgs.
International Search Report and Written Opinion as issued in connection with International Patent Application No. PCT/US2019/060282, dated Mar. 3, 2020, 7 pages.
U.S. Office Action in U.S. Appl. No. 16/658,016, dated Mar. 5, 2020, 13 pgs.
U.S. Office Action in U.S. Appl. No. 16/658,016, dated Apr. 22, 2020, 19 pgs.

\* cited by examiner

ENERGY CONSERVATION USING ACTIVE DEMAND STABILIZATION

BACKGROUND

Energy conservation in industrial settings is critical. It is estimated that industrial power consumption comprises as much as half of the total global energy consumption. It goes without saying that power consumption poses grave risks to the environment. In addition, power costs are increasing and will likely continue to do so. Industrial power control and conservation techniques for industrial facilities are both environmentally and financially beneficial.

From a policy perspective many jurisdictions are working to improve the demand response on the power grid. Indeed, The United States Energy Policy Act of 2005 has mandated the Secretary of Energy to submit to the US Congress "a report that identifies and quantifies the national benefits of demand response and makes a recommendation on achieving specific levels of such benefits by Jan. 1, 2007." In addition, it is estimated that a 5% lowering of electricity demand could result in a 50% price reduction during the peak hours of the California electricity crisis in 2000 and 2001. Thus, one aspect of energy conservation includes power demand response initiatives.

SUMMARY

Systems and methods are disclosed for power conservation using power demand stabilization techniques in industrial facilities such as, for example, in an industrial cooling facility. A number of demand stabilization techniques are disclosed.

Some embodiments include an electric power demand stabilization method that may include receiving an indication that a specific controllable device (or multiple controllable devices) will have a high power draw event; retrieving a power draw profile for the specific controllable device that includes at least a maximum power draw and an event duration; identifying a plurality of low priority controllable devices with a combined power draw that is substantially equal to the maximum power draw of the specific controllable device; and turning off (or turning down) the power to the plurality of low priority controllable devices for a time period substantially equal to the event duration.

In some embodiments, the electric power demand stabilization method may also include adding the maximum power draw to the instantaneous facility power draw to create a total power draw; and determining whether the total power draw is greater than a power draw constraint. The maximum power draw, for example, may be the maximum power used by a controllable device when the controllable device is starting up or during normal operation (e.g., steady state operation). As another example, the maximum power draw may include any metric of power used by the controllable device during start up or during normal operation, such as, for example, the average power draw, the maximum power draw over a 15-minute interval, the maximum power draw over predetermined time intervals (e.g., predetermined time intervals may include a time interval that an electric utility measures power over).

In some embodiments, the electric power demand stabilization method may also include, for example, after the time period, turning on (or turning up) the low priority controllable devices.

In some embodiments, the high power draw event may be predicted based on a power draw scheduled for a plurality of a controllable devices, wherein the plurality of controllable devices includes the plurality of low priority devices.

In some embodiments, the high power draw event may be predicted based on the occurrence of an event associated with a second controllable device.

In some embodiments, the specific controllable device may comprise a compressor in a cold storage facility.

In some embodiments, the identifying a plurality of low priority controllable devices with a combined power draw that is substantially equal to the maximum power draw of the specific controllable device may include retrieving a priority database that includes a plurality of controllable devices, the power draw of each controllable device, and the priority of each controllable device. In some embodiments, the electric power demand stabilization method may also include selecting a combination of controllable devices from the database with a combined power draw that is substantially equal to the difference between current power draw and desired power draw of the plurality of controllable devices and that have low priority in comparison with the other controllable devices in the database.

Some embodiments include an electric power demand stabilization method that includes receiving an instruction to turn on a specific controllable device with a high startup power draw; retrieving a power draw profile for the specific controllable device that includes a power draw for each period of time over a startup duration and a maximum power draw; identifying a plurality of low priority controllable devices with a combined power draw that is greater than or equal to the maximum power draw; and turning down the power to the plurality of low priority controllable devices by an amount substantially equal to the power draw profile of the specific controllable device at a given time.

In some embodiments, the specific controllable device may include a compressor in a cold storage facility.

In some embodiments, the identifying a plurality of low priority controllable devices with a combined power draw that is greater than or equal to the maximum power draw may include retrieving a priority database that includes a plurality of controllable devices, the power draw of each controllable device, and the priority of each controllable device.

In some embodiments, the method may include selecting a combination of controllable devices from the database with a combined power draw that is substantially equal to the maximum power draw of the specific controllable device and that have low priority in comparison with the other controllable devices in the database.

In some embodiments, the startup duration may be less than 15 minutes.

Some embodiments may include an electric power demand stabilization method that includes receiving an instruction to turn on a first controllable device within a facility having a plurality of controllable devices; determining that a second controllable device of the plurality of controllable devices is currently turned on; pausing for a first period of time; turning off the second controllable device; and turning on the first controllable device.

In some embodiments, the first controllable device may be a first compressor in a cold storage facility and the second controllable device may be a second compressor in a cold storage facility.

In some embodiments, the length of the first period of time may be determined based on whether the first controllable is an early-starting device or a late-starting controllable device.

In some embodiments, the length of the first period of time may be determined based on a reading from one or more environmental sensors.

Some embodiments include system that includes a plurality of controllable devices; a plurality of sensors configured to measure aspects of a facility environment; and a facility coordinator in communication with the plurality of controllable devices and the plurality of environmental sensors. In some embodiments, the facility coordinator may be configured to: receive an indication that a specific controllable device will have a high power draw event; retrieve a power draw profile for the specific controllable device that includes at least a maximum power draw and an event duration; identify a plurality of low priority controllable devices with a combined power draw that is substantially equal to the maximum power draw of the specific controllable device; and turn off the plurality of low priority controllable devices for a time period substantially equal to the event duration.

In some embodiments, the high power draw event may be predicted based on a power draw scheduled for a plurality of a controllable devices, wherein the plurality of controllable devices includes the plurality of low priority devices In some embodiments, the identifying a plurality of low priority controllable devices with a combined power draw that may be substantially equal to the maximum power draw of the specific controllable device further comprises retrieving a priority database that includes a plurality of controllable devices, the power draw of each controllable device, and the priority of each controllable device.

In some embodiments, the facility coordinator may be configured to select a combination of controllable devices from the database with a combined power draw that is substantially equal to the maximum power draw of the specific controllable device and that have low priority in comparison with the other controllable devices in the database.

These illustrative embodiments are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are disclosed to aid in power conservation for industrial facilities such as, for example, in an industrial cooling facility. Some embodiments include control techniques that can be used to stabilize power in an industrial facility. Demand stabilization can be beneficial for a number of reasons especially for energy conservation, energy planning, power smoothing, and energy demand stabilization. Various stabilization techniques are disclosed that can stabilize the power demands at a facility in short times scales such as, for example, less than about 15-30 minutes.

Figure 1:
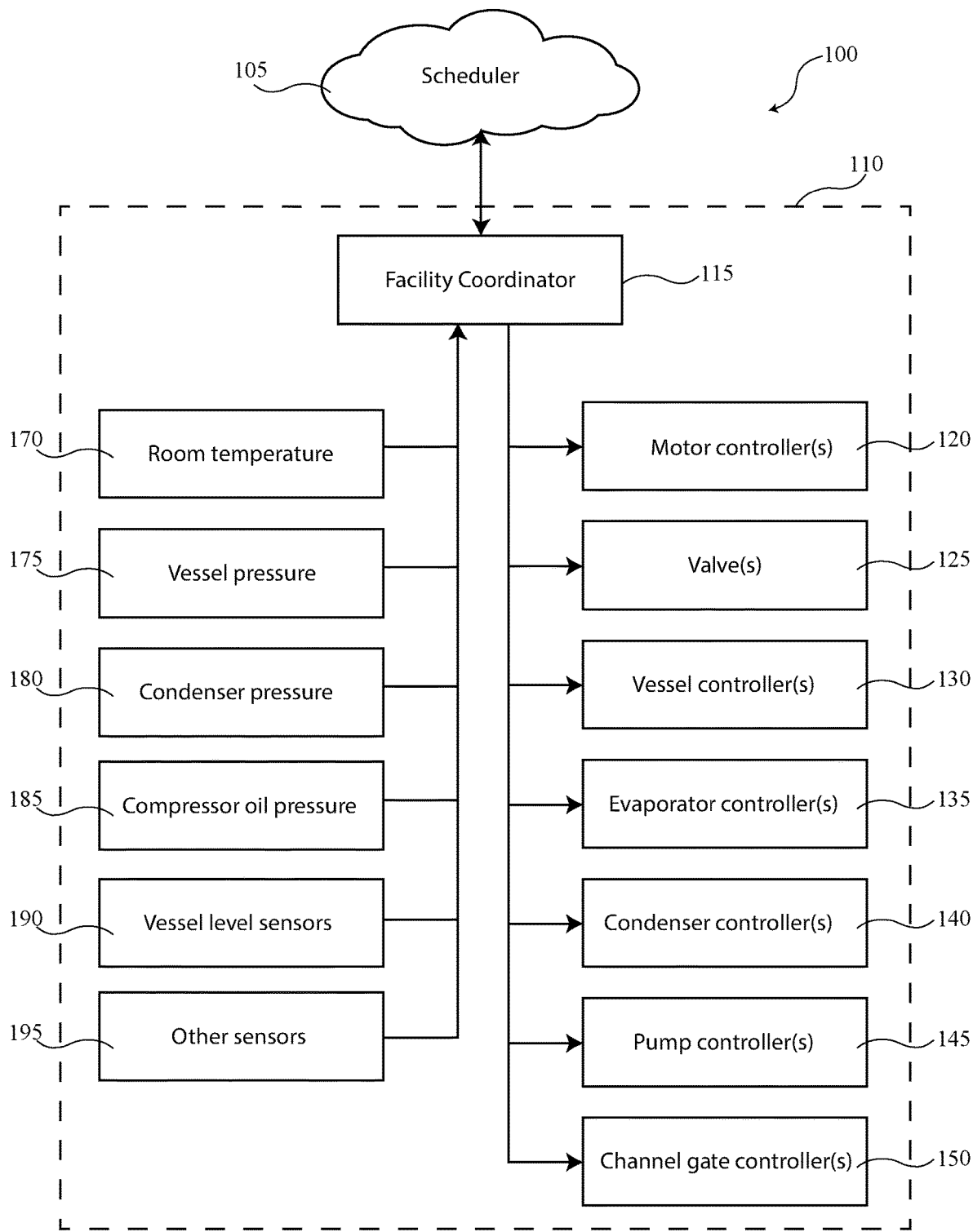
FIG. 1 is a block diagram of an industrial facility control system according to some embodiments.

FIG. 1 is a block diagram of an industrial facility control system 100 according to some embodiments. In some embodiments, the industrial facility control system 100 includes a scheduler 105. The scheduler 105 may be a cloud-based computing system (e.g., Amazon Web Services, Google Cloud, Microsoft Azure, IBM Cloud, etc.) that can use various predictive techniques, which may be based on the state of the facility as determined based on data from various sensors within an industrial facility 110, to control various controllable devices, which may occur through an onsite facility coordinator or may occur directly from the cloud or both. In some embodiments, the scheduler 105 may include various algorithms that can be used to optimize the energy use according to various metrics such as, for example, based upon energy usage within the industrial facility 110.

In some embodiments, the industrial facility control system 100 includes an industrial facility 110 and a scheduler 105. The industrial facility 110 may include any type of facility that may include various subsystems and/or systems. For example, the industrial facility 110 may be a cold storage facility, a factory, a farm, a packing house, a dairy, a grow facility, a hydroponic facility, a warehouse, a distribution center, a cement manufacturing facility, oil and gas processing facilities, water treatment plants, oil refineries, petrochemical processing facilities, chemical processing facilities, natural gas processing facilities, crop irrigation, water districts, desalination plants, etc.

In some embodiments, the industrial facility control system 100 may include a facility coordinator 115. The facility coordinator 115 may be in communication with the scheduler 105 via any network connection. In some embodiments, the network connection may be a wired connection such as, for example, via the Internet. In some embodiments, the communication channel between the facility coordinator 115 and the scheduler 105 may be initiated via a request from the facility coordinator 115. In some embodiments, the network connection may be a wireless connection such as, for example, a 4G or 5G network (or similar), an LTE network, a satellite network, a USB network, Bluetooth network, etc.

In some embodiments, the industrial facility 110 may include any number of controllable devices such as, for example, motors 120 (e.g., fans, turbines, etc.), valves 125, vessels, evaporators, condensers, pumps, compressors, doors, underfloor heating elements, lighting, defrost equipment, centrifuges, furnaces, etc. In some embodiments, the controllable devices may be controlled by a device controller that interfaces with the facility coordinator 115. For example, a vessel may be controlled by a vessel controller 130; an evaporator may be controlled by an evaporator controller 135; a condenser may be controlled by a condenser controller 140; a pump may be controlled by a pump controller 145, a channel gate controller 150, valves may be controlled by a valve controller, and heaters/heating elements may be controlled by heater/heating element controllers, or an any other controllable device or controller. In some embodiments, these controllers may be coupled with the facility coordinator 115, may be integrated with the controllable device, and/or may or may not be designed by the manufacturer of the controllable device.

In some embodiments, the facility coordinator 115 may be in communication with each of the controllable devices and may provide commands to the various controllable devices.

In some embodiments, the industrial facility 110 may include any number of sensors such as, for example, a temperature sensor 170, a vessel pressure sensor 175, a condenser pressure sensor 180, a compressor oil pressure sensor 185, vessel level sensor 190, a humidity sensor, a fan speed sensor, a voltage sensor, or anemometer, flow meter, microphone, vibration sensor, pH meter, optical density meter, chemical concentration sensors, or any other sensor 195. The sensor may include any type of transducer that can translate physical properties into an electrical signal (either an analog or digital signal) that can be communicated to the facility coordinator 115 via a wired or wireless communication network. In some embodiments, the sensors may include any type of Internet of Things (IoT) device that can measure physical properties and communicate these properties to a network database such as, for example, at the facility coordinator 115.

In some embodiments, an industrial facility 110 may be a cold storage facility that may include any number of buildings. In some embodiments, an industrial facility 110 may include one or more cold storage buildings that use a vapor-compression refrigeration system to cool one or more rooms within the cold storage facility.

Figure 2:
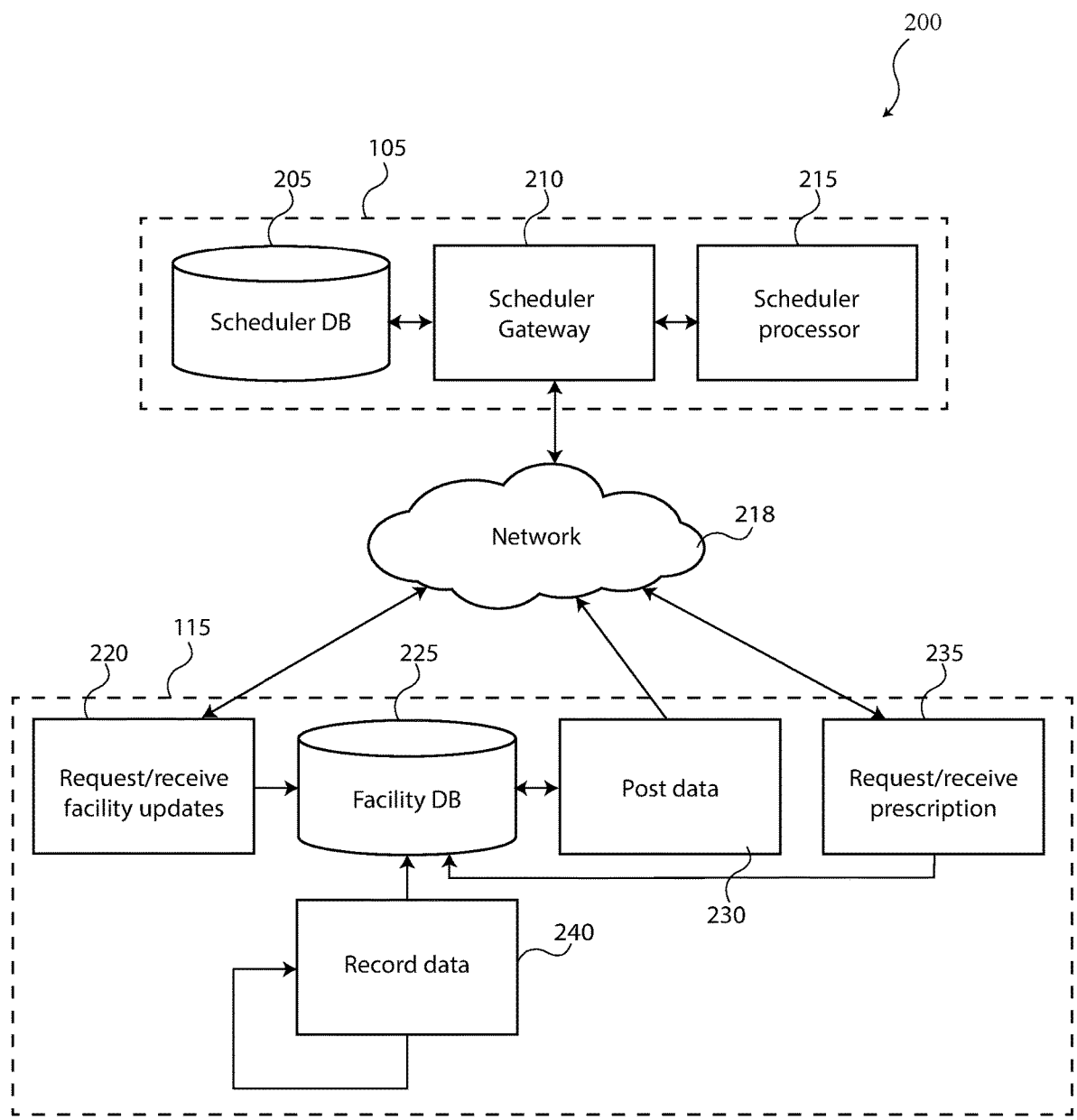
FIG. 2 is a block diagram showing communication pathways between a scheduler and a facility coordinator according to some embodiments.

FIG. 2 is a block diagram 200 showing communication pathways between the scheduler 105 and the facility coordinator 115 according to some embodiments. The scheduler 105 may include a scheduler database 205, cloud gateway 210, and a scheduler processor 215. The scheduler database 205 may include any type of database including a cloud database. The scheduler database 205 may be located in one or more locations and may include a database of prescriptions, facility information and properties, constraints, algorithms, etc.

The cloud gateway 210 may include any type of communication interface that allows the scheduler 105 to communicate with the network 218. The network may include a wireless connection such as, for example, a 4G or 5G network (or similar), an LTE network, a satellite network, etc. The network may include the Internet.

Figure 13:
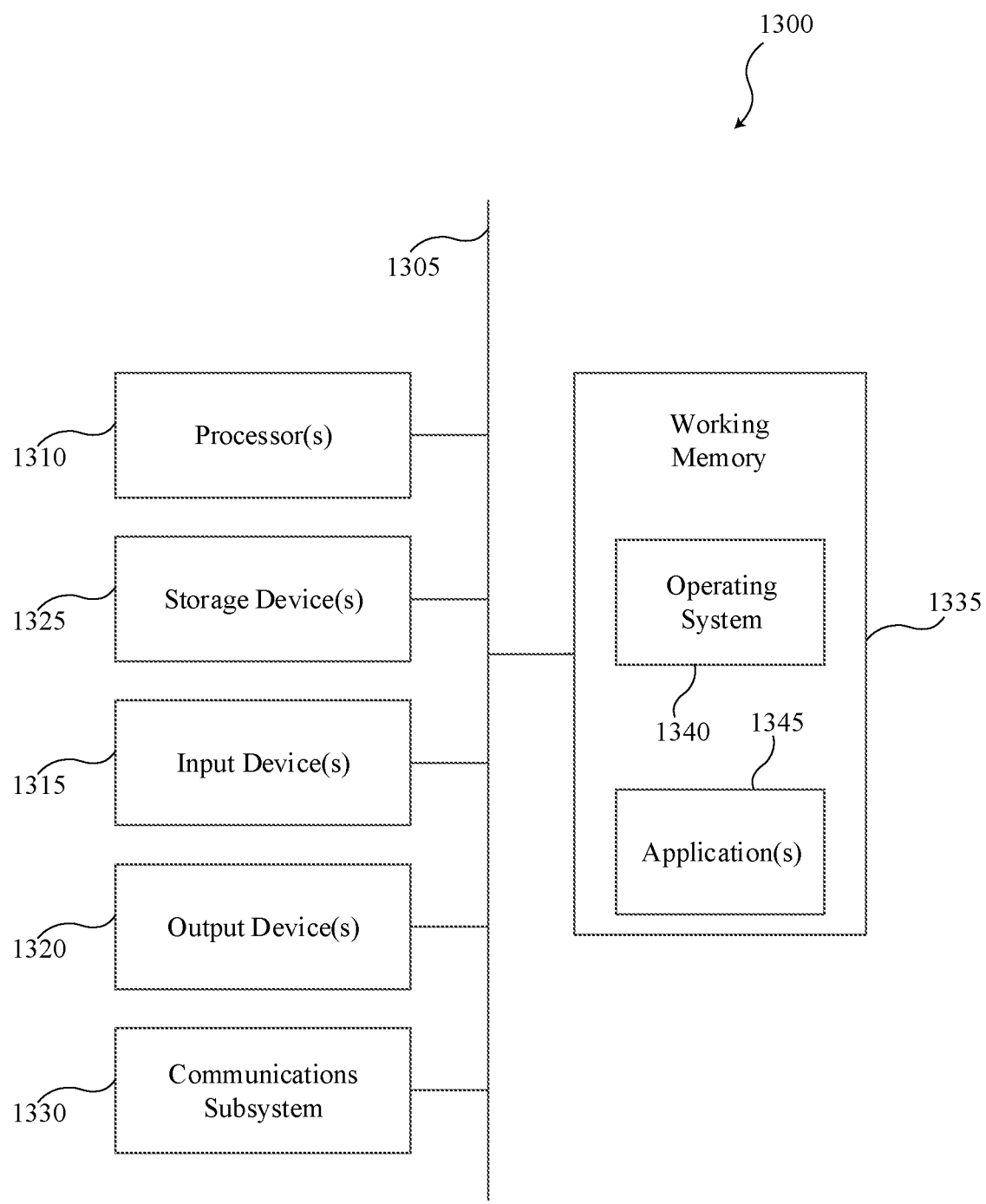
FIG. 13 shows an example computational system for performing functionality to facilitate implementation of embodiments described herein.

The scheduler processor 215 may include any or all elements of computational system 1300 shown in FIG. 13. The scheduler processor 215 may create various prescriptions based on various parameters such as, for example, power demands, cost savings, etc. The scheduler processor 215 may communicate prescriptions to one or more facility coordinators 115 via the cloud gateway. The scheduler processor 215 may communicate with the scheduler database 205 via the cloud gateway.

The facility coordinator 115 may communicate with the scheduler 105 via a number of different pathways. For example, the facility coordinator 115 may request or receive facility updates via block 220. These facility updates may include constraint updates, firmware updates, software updates, data collection cadence, etc. The updates may be stored in a facility database 225, which may include a local or cloud database. Block 220 may communicate with the scheduler via a facility update communication channel. The facility update communication channel may require block 220 to request facility updates, and in response the scheduler may push facility updates. Alternatively or additionally, facility updates may be pushed to the facility coordinator 115.

As another example, the various sensors disposed throughout the industrial facility 110 may write sensor data to the facility database 225. The various sensors are represented by block 240 showing the sensors recording sensor data on a known cadence. Sensor data may be posted to the scheduler via block 230. The data communication channel may be a one-way communication channel from the facility coordinator 115 to the scheduler 105. Data may be pushed from the facility coordinator 115 to the scheduler 105 via the data communication channel. Alternatively or additionally, data may be requested by the scheduler 105 via the data communication channel.

Some embodiments may include power draw sensors such as, for example, a CT clamp (current transformer clamp) that measures the current going through the wire. As another example, power draw data can be received from a power meter. In some embodiments, the power draw for a facility or a plurality of controllable devices may be estimated based on which of the plurality of controllable devices are currently turned on and the average power draw of each of the controllable devices. The total power draw can be estimated by summing the power draw estimates of each of the controllable devices. The power draw can be estimated, for example, through a combination of the previous two methods.

As another example, prescriptions may be requested or received via block 235. For example, a facility coordinator may request a prescription from the scheduler 105 and in response the scheduler may send a prescription via the prescription communication channel. Received prescription may be stored in the facility database 225.

The various communication channels, the prescription communication channel, the data communication channel, and the facility update communication channel, may be separate communication channels or a shared channel.

Regardless, the process for receiving facility updates, posting data to the scheduler, or requesting and receiving prescriptions may operate independent relative to one another. For instance, data may be collected from the sensors and posted to the scheduler 105 independent from prescriptions being received from the scheduler and the application of a prescription.

Figure 3:
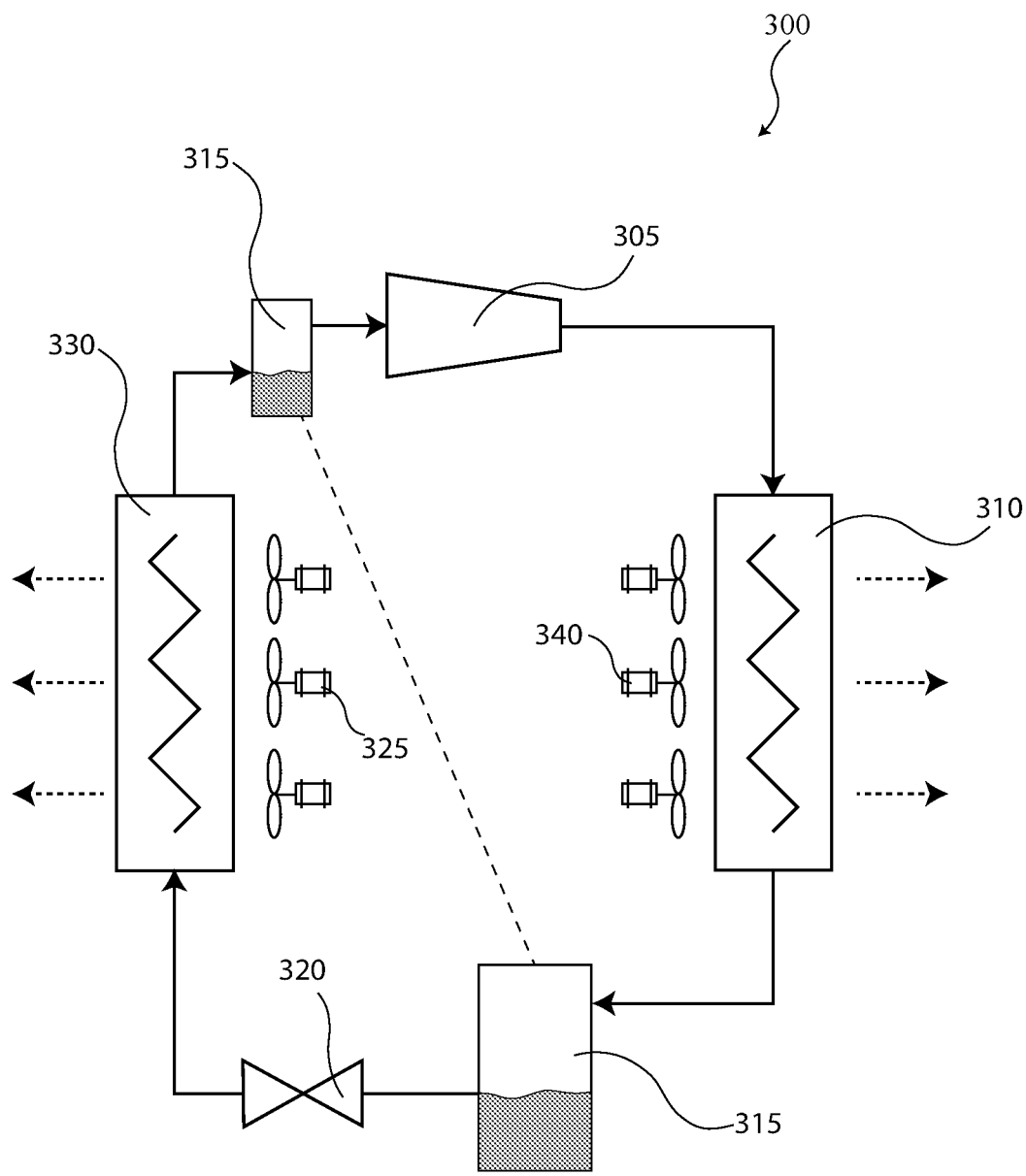
FIG. 3 is a block diagram of a direct expansion single stage vapor-compression refrigeration system according to some embodiments.

A block diagram of an example refrigeration system 300 is shown in FIG. 3. The refrigeration system 300 may include one or more compressors 305, one or more condensers 310, vessel 315, one or more expansion valves 320, one or more evaporators 330, a plurality of evaporator fans 325, and a plurality of condenser fans 340. In some embodiments, the condenser 310 may include the plurality of condenser fans 340. In some embodiments, the evaporator 330 may include the plurality of evaporator fans 325. The vessel 315, while shown graphically as two vessels, may be a single vessel. In some embodiments, the vessel 315 may enclose the refrigerant in both vapor and liquid states. The liquid level within the vessel 315 may be vary based on various parameters.

In some embodiments, a circulating liquid refrigerant can be used in the refrigeration system 300 as the medium which absorbs and removes heat from a space to be cooled within the industrial facility 110 and subsequently rejects that heat elsewhere. The refrigeration system 300 may include a compressor 305, a condenser 310, a thermal expansion valve 320 (e.g., which also may be called a throttle valve or metering valve), an evaporator 330, or a vessel 315. The circulating refrigerant can enter the compressor 305 from the vessel 315 in the thermodynamic state known as a vapor (e.g., saturated vapor or non-saturated vapor) and is compressed to a higher pressure, resulting in a higher temperature as well. The hot, compressed vapor can then be in the thermodynamic state known as a superheated vapor and is at a temperature and pressure at which it can be condensed with either cooling water or cooling air flowing across coils or tubes in the condenser 310. This is where the circulating refrigerant can reject heat from the system. The rejected heat can be carried away by either the water or the air (whichever may be the case). The condenser fans 340, for example, can blow air across the condenser 310, which may warm the air carrying away the heat.

The condensed liquid refrigerant, in the thermodynamic state known as a saturated liquid, can then be returned to and held in vessel 315. The liquid refrigerant may then be routed through an expansion valve 320 where it undergoes an abrupt reduction in pressure. That pressure reduction may result in the adiabatic flash evaporation of a part of the liquid refrigerant. The auto-refrigeration effect of the adiabatic flash evaporation can lower the temperature of the liquid and vapor refrigerant mixture to where it is colder than the temperature of the enclosed space to be refrigerated; this may occur within the evaporator 330.

The cold mixture can be routed through coils or tubes in the evaporator 330. One or more evaporator fans 325 can circulate the warm air in the enclosed space across the coil or tubes carrying the cold refrigerant liquid and vapor mixture. That warm air evaporates the liquid part of the cold refrigerant mixture. At the same time, the circulating air is cooled and thus lowers the temperature of the enclosed space. The evaporator 330 is where the circulating refrigerant absorbs and removes heat which is subsequently rejected in the condenser 310 and transferred elsewhere by the water or air used in the condenser 310.

To complete the refrigeration cycle, the refrigerant vapor from the evaporator 330 is again a saturated vapor and is routed back into the compressor 305.

In some embodiments, the facility coordinator 115 may receive sensor data from one or more sensors. In some embodiments, the sensor data may be stored at the facility coordinator 115. In some embodiments, the sensor data may be communicated to the scheduler 105 and/or stored in a database in the cloud. In some embodiments, the sensor data may be stored at the facility coordinator 115 and communicated to the scheduler 105 on a predetermined cadence such as, for example, every minute, every few minutes, every 15 minutes, every hour, every day, every week, or every month. In some embodiments, the facility coordinator 115 may also communicate information such as the active prescription, corrective action applied, modifications to a prescription, etc. In some embodiments, the facility coordinator 115 may apply some corrective action based on the sensor data.

To control the facility, in some embodiments, the facility coordinator 115 may receive one or more prescriptions from the scheduler 105. A prescription may include one or more environmental, process, or facility setpoints to be conducted or achieved by the facility coordinator 115. In some embodiments, the facility coordinator 115 may translate a prescription to achieve a setpoint based on the specific devices, equipment, environment, controllers, etc. located within the industrial facility 110. In some embodiments, the facility coordinator 115 may receive abstract or broad facility prescriptions and translate these prescriptions into a translated prescription that may, for example, include actionable or specific commands, which may be manifested by changing setpoints to equipment controllers and/or higher level control systems, individual device actuator signals, etc., and/or some combination thereof, and which can be implemented, applied, or executed within a specific facility. The facility coordinator 115 may translate a prescription from the scheduler 105 into a prescription that is actionable at the specific industrial facility 110 based on the various constraints and equipment at the specific industrial facility 110. In some embodiments, the scheduler 105 may perform some translation of the prescriptions prior to transmission to the facility coordinator 115.

In some embodiments, a prescription may be provided by the scheduler 105 to attempt to optimize energy use within the industrial facility 110. For example, a prescription may include a temperature setpoint for a specific industrial facility 110 and/or components or portions of the industrial facility 110 such as, for example, one or more rooms or one or more blast cells; a fan speed setpoint for one or more fans; a vessel pressure setpoint or a vessel level setpoint for one or more vessels, a compressor energy usage setpoint or a compressor speed setpoint for one or more compressors; a defrost time period or schedule, a duration of defrost sub events within a defrost event, a condenser pressure setpoint for one or more compressors, an irrigation channel gate position setpoint, a water pump power setpoint or a water pump speed setpoint for one or more water pumps, an irrigation line valve setpoint for one or more irrigation line valves, a fertilizer feed rate, a flow rate setpoint for one or water pumps, an industrial agitator motor speed setpoint for one or more motors, or a turbine speed setpoint, etc.

In some embodiments, the facility coordinator can include all or a portion of the components of the computational system 1300 shown in FIG. 13.

In addition, in some embodiments, the facility coordinator 115 may receive one or more equipment constraints, operational constraints, or environmental constraints (collectively or individually "constraints") from the scheduler 105 or have one or more equipment constraints, operational constraints, or environmental constraints hard coded within the facility coordinator 115. The facility coordinator 115 may receive one or more constraints from the scheduler 105 at a given time and update the constraint at the facility coordinator 115. In some embodiments, constraints may be hard-coded within a given equipment or device, or hard-coded within the facility coordinator 115. In some embodiments, certain hard-coded constraints may not be modifiable remotely.

An equipment constraint, for example, may include a maximum vessel pressure, a minimum vessel pressure, a maximum vessel level, a minimum vessel level, a maximum compressor oil temperature, maximum compressor intake pressure, minimum compressor discharge pressure, minimum running compressor speed, a maximum condenser pressure, a maximum fan speed, a minimum running fan speed, etc. Any of the equipment constraints, for example, may be a function of operational, environmental, and other equipment states.

An environmental constraint, for example, may include a maximum temperature, a minimum temperature, a maximum humidity, a minimum humidity, maximum pressure, minimum pressure, lights on/off, etc. In some embodiments, an environmental constraint may be specific to a facility, a subsection of a facility, or a given room within a facility. In some embodiments, an environmental constraint may depend on a product, a product family, or a product type.

An operational constraint, for example, may include any type of constraint related to operations, or constraints that are not environmental constraints or equipment constraints. An operational constraint, for example, may include a constraint to periodically defrost certain pipes, lower the fan speeds during certain hours, lower or turn off the fans when a door is open or within a time period of being opened, quickly freeze certain items within a certain period of time, lights on time, lights off time, etc. The operational constraints, for example, may include time-based constraints.

In some embodiments, the constraints may be hierarchical. For example, a temperature constraint may override a constraint that limits the time period when fans are running. As another example, a vessel pressure constraint may override a fan speed constraint. As another example, an equipment constraint may override an operational constraint. As another example, an equipment maintenance schedule constraint may take precedent or have priority over a cooling power constraint. Constraints may take a hierarchy of priority, including immutable properties of a piece of equipment (e.g., a fan speed is bound by zero and its max rpm, the level of a vessel is bound by zero and the height of the vessel, etc.), environmental constraints (e.g., room temperature, humidity, etc.), and prescribed constraints (e.g., the scheduler prescribing a fan speed (e.g., scheduler 105), cooling power, etc.). In all cases, a prescribed constraint has the lowest priority. As an example, a room temperature operational constraint may override an evaporator fan speed prescription/cooling power prescription. An as another example, a vessel pressure safety constraint may override an environmental constraint such as, for example, a room temperature setpoint. Various other hierarchies may be defined and followed.

In some embodiments, the scheduler 105 may be located in the cloud, at the facility, or any other location. In some embodiments, the scheduler 105 may include a bang-bang controller, a PID controller, a manual command from a user, an onsite server, a remote server, a cloud server, etc.

Figure 4:
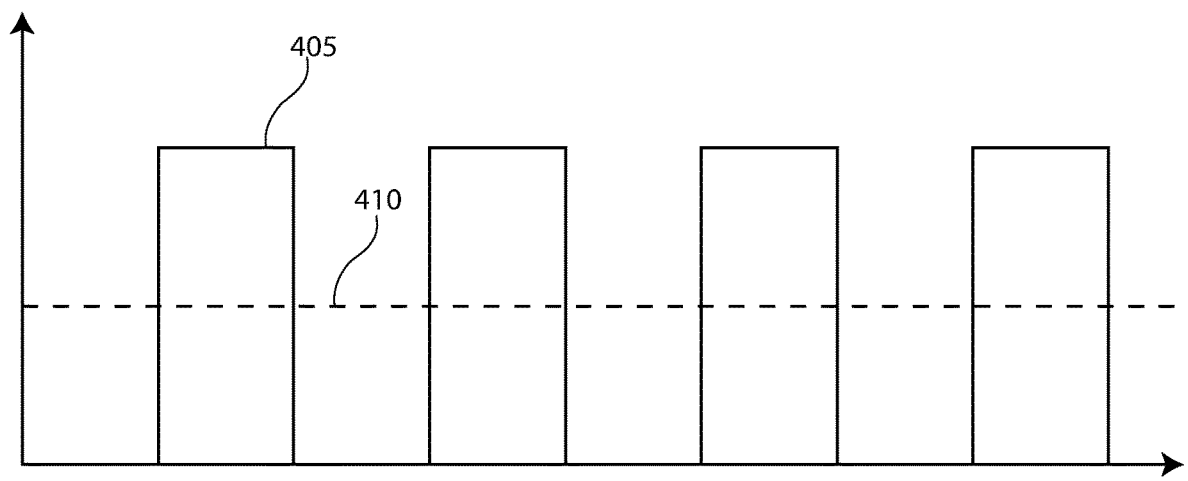
FIG. 4 is an example graph showing the total power of a system using automatic demand stabilization and without automatic demand stabilization according to some embodiments.

FIG. 4 is an example graph showing the total power of a system with automatic demand stabilization and without automatic demand stabilization according to some embodiments. The system may include a group of controllable devices or a facility with a plurality of controllable devices. The power curve 405 is the power draw of a system without automatic demand stabilization. As shown in the graph, this power curve varies over time. The power curve 405, for example, may be the power curve for a compressor (e.g., compressor 305) or fans (e.g., fans 340, fans 325), etc. over the course of a portion of a day. The compressor, for example, may be turned on for a period of time to cool a cooler when the temperature in the cooler has reached or is approaching a predetermined temperature (e.g., a setpoint). The compressor may be turned off for another period of time once the temperature in the cooler has reached a predetermined temperature.

The power curve 410, for example, shows the power draw for a system that uses automatic demand stabilization to smooth the power draw over time. In an ideal scenario, the power curve 410 does not vary over time. Instead, the power curve may be substantially flat over time. In some embodiments, the power curve using automatic demand stabilization may still vary over time, but it may vary less than without automatic demand stabilization.

Figure 5:
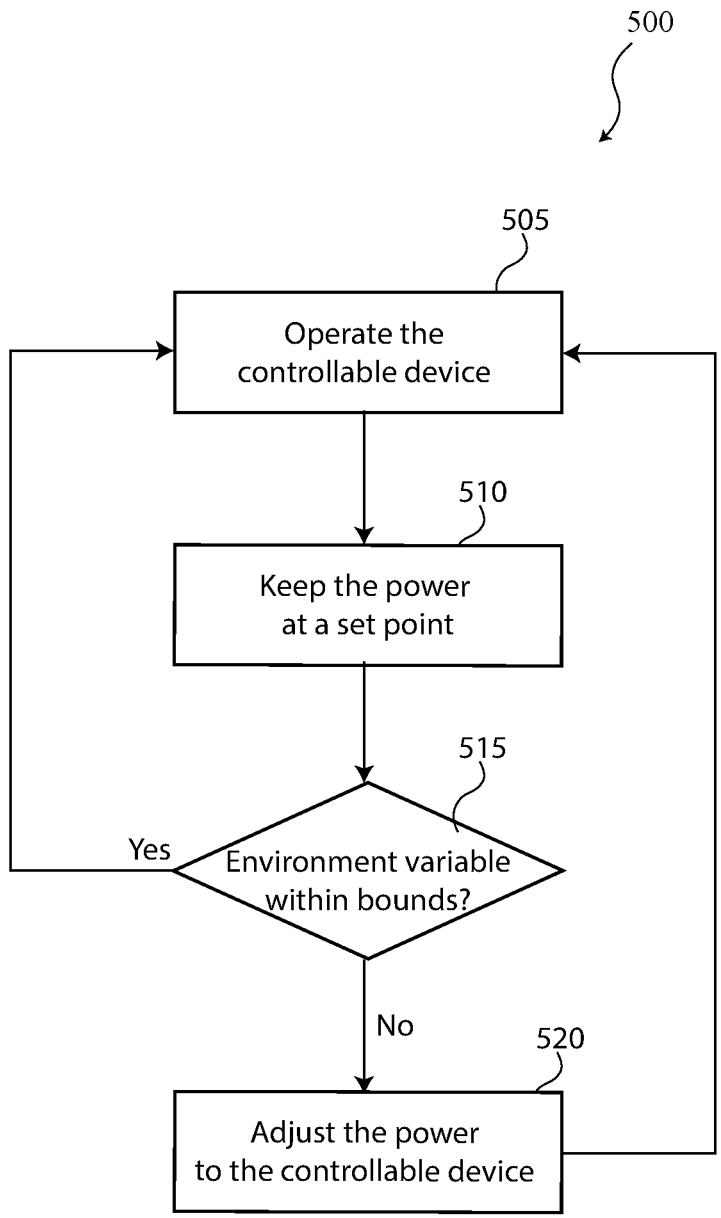
FIG. 5 is a flowchart of an example process for achieving automatic demand stabilization according to some embodiments.

FIG. 5 is a flowchart of an example process 500 for achieving automatic demand stabilization according to some embodiments. The process 500 may include one or more additional blocks. The blocks shown in the process 500 may occur in any order and over any period of time. Any of the blocks shown in the process 500 may be removed, replaced, or may occur in any order.

The process 500 begins at block 505 where one or more controllable devices are being operated. These controllable devices may, for example, include any or all the controllable devices discussed above in regard to the industrial facility control system 100 or the refrigeration system 300.

At block 510 the power to the one or more controllable devices can be kept at a predetermined setpoint for each controllable device. For example, a PID (proportional-integral-derivative) control algorithm or any other setpoint control algorithm can be used to keep the power to the one or more controllable devices at the predetermined setpoint. In some embodiments, block 510 may average the power over a period of time such as, for example, 10, 15, 30, 60, 90, 120 minutes and compare the average power with the predetermined setpoint.

For example, the instantons power draw for a controllable device, a system of controllable devices, or a facility can be measured in real time. The PID control algorithm can control the power to the one or more controllable devices in such a way to ensure the instantaneous power draw of the controllable device, a system of controllable devices, or a facility is set at the rolling average power draw (e.g., box car rolling average, exponential rolling average, etc.) of the controllable device, the system of controllable devices, or the facility over a period of time (e.g., 30, 60, 90, etc. mins).

At block 515 one or more environment variables may be monitored to ensure it is within predetermined bounds. The one or more environment variables, for example, do not include the power draw of the one or more controllable device. For example, the controller (e.g., the facility coordinator 115) may determine if the one or more environment variables are below an upper bound, $V_{max}$, or above a lower bound, $V_{min}$. If one or more environment variables are out of bounds, then process 500 proceeds to block 520. If the environment variables are within bounds, then process 500 proceeds back to block 505.

In some embodiments, the predetermined bounds may include safety, physical, or environmental constraint.

At block 520 the power to at least one of the one or more controllable devices may be increased or decreased in an attempt to get the environment variable to be within the predetermined bounds. In some embodiments, the power to the controllable device may be proactively increased or decreased based on trends over a period of time.

For example, in the refrigeration system 300, if the pressure within the vessel 315 drops below a predetermined lower bound (see block 515), then at block 520, the power to the condenser can be lowered. If the pressure within the vessel 315 rises above a predetermined upper bound (see block 515), then at block 520, the power to the condenser can be increased.

As another example, in the refrigeration system 300, if the temperature within a cooler drops below a predetermined lower bound (see block 515), then at block 520, the power to condenser or fans can be lowered. If the temperature within the cooler rises above a predetermined upper bound (see block 515), then at block 520, the power to the condenser or fans can be increased.

In some embodiments, the total power draw of a plurality of controllable devices can be smoothed to produce an total power draw that has a low variability such as, for example, less than about 10% over time or with a reduction of the peak power draw of 40%.

Some embodiments can include power draw staggering techniques that can be used to smooth the total power at a facility. In some embodiments, a facility may include one or more power-consuming controllable devices that can either be on or off with a fixed duty cycle. Power draw staggering techniques may, for example, intelligently schedule the on-times of all controllable devices. This can be done, for example, to ensure the total power draw of the facility over a period of time can remain relatively constant.

Figure 6:
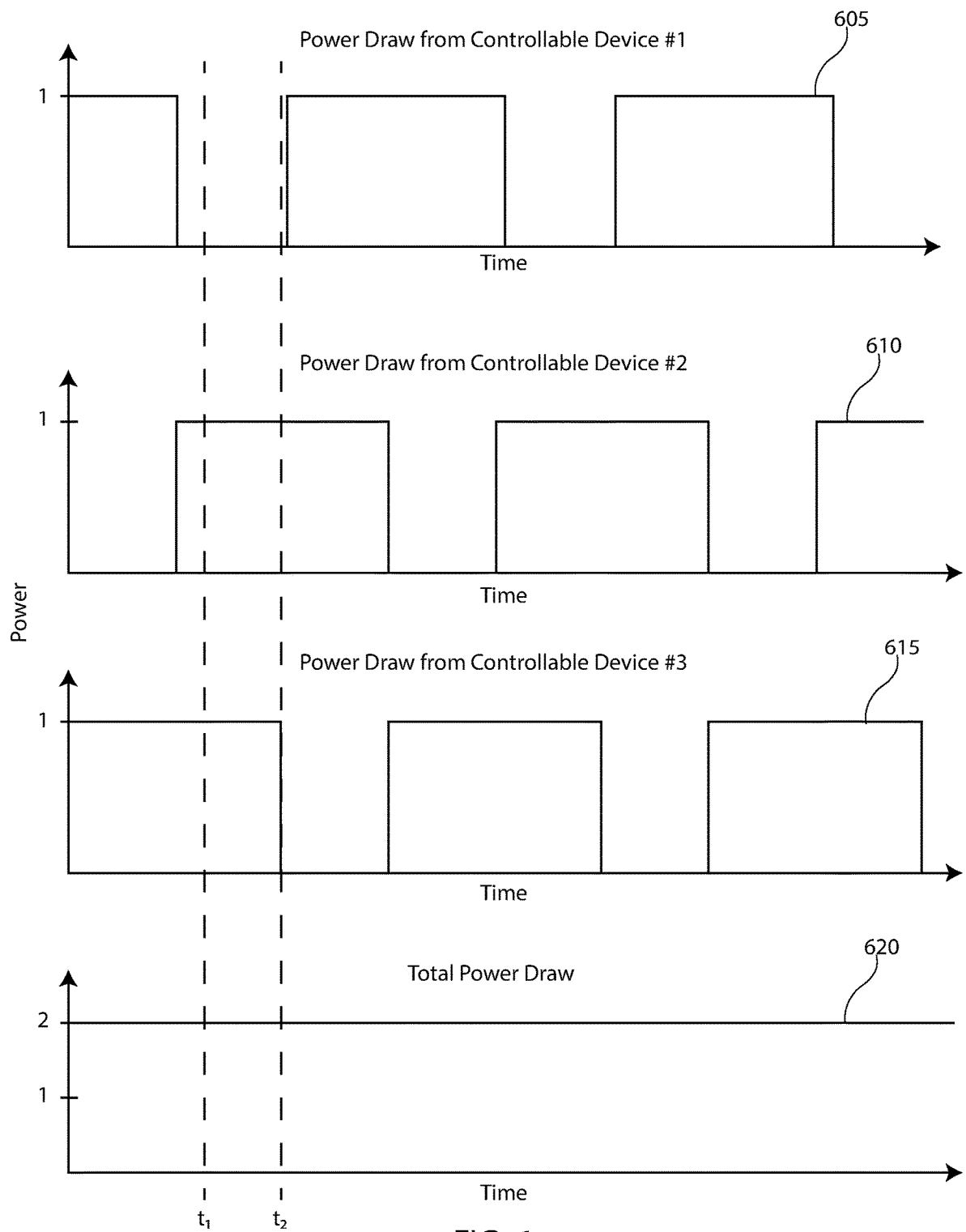
FIG. 6 are example graphs showing the power of three controllable devices and the total power of a system using automatic demand stabilization according to some embodiments.

FIG. 6 shows example graphs showing the power of three controllable devices and the total power of a system using power draw staggering techniques according to some embodiments. Power curve 605 illustrates the power of a first controllable device over time; and varies over time as the first controllable device is turned on and off. Power curve 610 illustrates the power of a second controllable device over time; and varies over time as the second controllable device is turned on and off. Power curve 615 illustrates the power of a third controllable device over time; and varies over time as the third controllable device is turned on and off. Power curve 620 illustrates a total power of the first controllable device, the second controllable device, and the third controllable device over time using automatic demand stabilization according to some embodiments. The total power curve 620, for example, is substantially flat. For example, the total power curve 620 may have a peak power total power draw that is only 5% or 10% etc. above the total power draw over a period of time (e.g., 10, 30, 60, or 90 minutes, etc.). In some embodiments, the total power over a period of time (e.g., 5, 10, 15, 20, 25, 30, etc. minutes) can be minimized.

For example, the three controllable devices can include compressors serving different coolers in a facility, which may require a duty cycle of two thirds in order to maintain food temperatures to safe levels. Any number of controllable devices with any type of duty cycles may be used. Without power draw staggering techniques, the controllable devices may be controlled using PIDs or timers, with no particular schedule. This strategy could result in a maximum power draw of three times the draw of any single controllable device when all three compressors are on simultaneously. Power draw staggering techniques, for example, may use algorithmic control to optimize the power schedule, resulting in staggered on-times. In some embodiments, power draw staggering techniques may provide sufficient cooling with a maximum power draw of only two thirds the power draw that could occur without power draw staggering techniques, which could result in a 33% reduction in demand charges.

The maximum power draw, for example, may include the maximum power used by a controllable device when the controllable device is starting up or during normal operation (e.g., steady state operation). As another example, the maximum power draw may include any metric of power used by the controllable device during start up or during normal operation, such as, for example, the average power draw, the maximum power draw over a 15-minute interval, the maximum power draw over predetermined time intervals (e.g., predetermined time intervals may include a time interval that an electric utility measures power over).

Power draw staggering techniques, for example, may be implemented by the facility coordinator. In some embodiments, power draw staggering techniques may read setpoints provided by a control system (e.g., cloud based scheduler or other modules/algorithms of a facility coordinator or an existing scheduler) or temperature sensor readings from various coolers. Existing naïve control techniques can be used to determine the relative phase or duty cycle (i.e. on/off timings) of the various compressors. Power draw staggering techniques may also uniformly distribute the compressor on-times.

Figure 7:
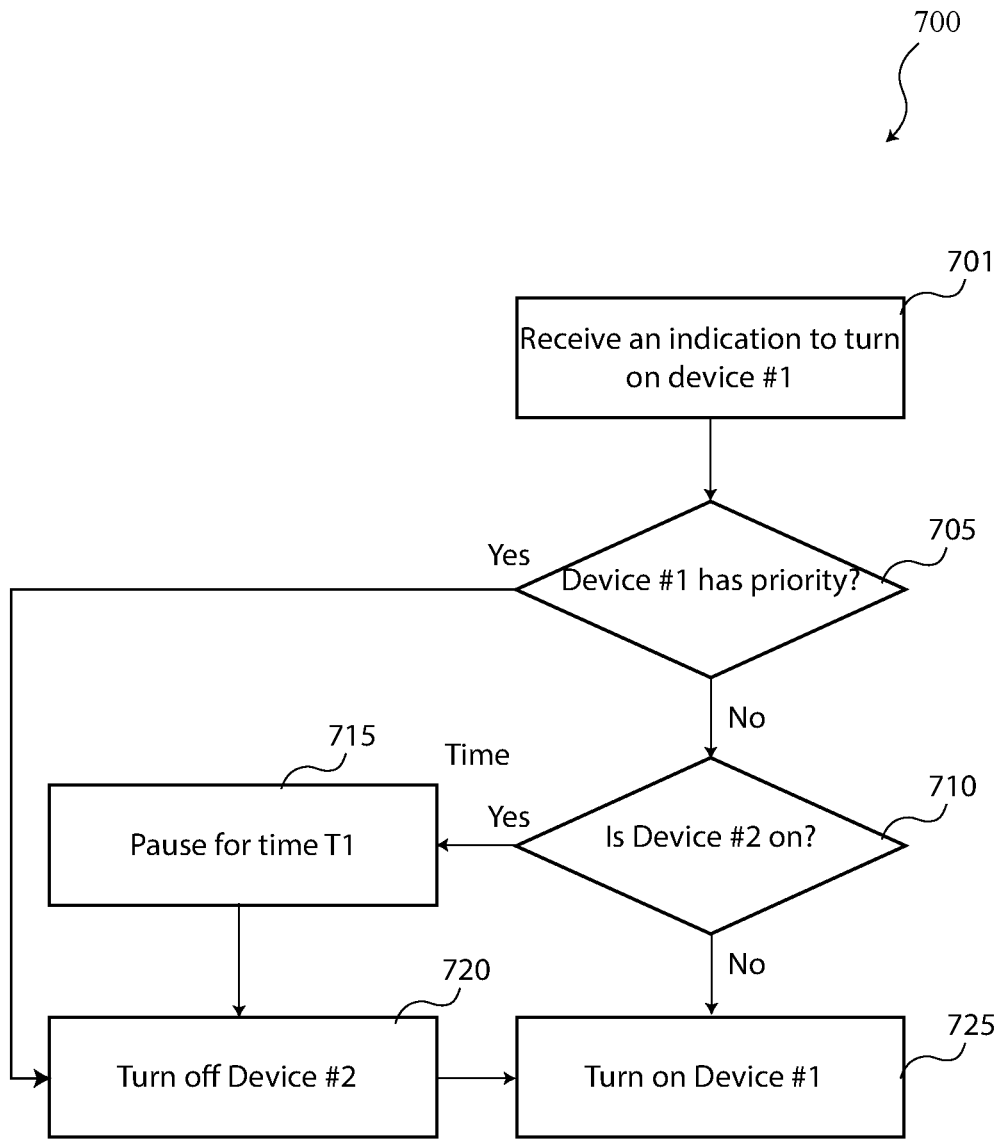
FIG. 7 is a flowchart of an example process of a power draw staggering technique according to some embodiments.

FIG. 7 is a flowchart of an example process 700 of a power draw staggering technique according to some embodiments. The process 700 may include one or more additional blocks. The blocks shown in the process 700 may occur in any order and over any period of time. Any of the blocks shown in the process 700 may be removed, replaced, or may occur in any order.

At block 701, an indication can be received to turn on controllable device #1. The indication, for example, may include an electronic signal or a memory location set in a computational unit that indicates that controllable device #1 should be turned on. The indication, for example, can be received from a scheduler such as, for example, scheduler 105, which may be located remotely (e.g., in the cloud) or at the facility 110. The indication, for example, can be received in response to an environmental sensor (e.g., the sensors shown in FIG. 1) setpoint or constraint being met or passed, or approaching a setpoint or constraint.

In some embodiments, the indication can be received by the facility coordinator 115. In some embodiments, the indication can be received by a demand stabilization controller, which may include all, one, or one or more components of computational system 1300.

In some embodiments, the indication, for example, can be received in response to an environmental sensor (e.g., the sensors shown in FIG. 1) setpoint or constraint being met or passed, or approaching a setpoint or constraint. In response, for example, the facility coordinator may provide an indication that the controllable device #1 should be turned on. In some embodiments, the indication may be an internal signal (e.g., an signal internal to facility coordinator #1) or a variable in memory of a controller.

For example, the temperature within a cooler may be monitored using a temperature sensor 170. If the temperature rises above a setpoint (e.g., greater than 2° C.), then the scheduler or the facility coordinator may indicate that the condenser (e.g., controllable device #1) should be turned on. As another example, if the pressure within a vessel (e.g., vessel 315) rises above a setpoint (e.g., greater than 5% setpoint or constraint) then the scheduler or the facility coordinator may indicate that the compressor (e.g., controllable device #1) may be turned on.

At block 705, the process 700 can determine whether controllable device #1 has priority over controllable device #2. If controllable device #1 has priority over controllable device #2, then process 700 can proceed to block 720. Otherwise, the process 700 can proceed to block 710. In some embodiments, priority may be indicated any number of different ways. For example, a database may include a priority database that lists controllable devices that have priority over other controllable devices. As another example, a controllable device may have priority based on the indication received at block 701. The indication, for example, may indicate that controllable device #1 has priority over other controllable devices.

In some embodiments, neither controllable device #1 nor controllable device #2 may have priority. In some embodiments, if controllable device #2 has priority, then time T1 in block 715 may be longer than otherwise.

At block 710, the process 700 can determine whether controllable device #2 is currently on. For example, controllable device #2 can be determined to be on based on the instantaneous power draw of controllable device #2. If controllable device #2 is on or one of the two devices is on then process 700 can proceed to block 725, where controllable device #1 is turned on. If controllable device #2 is turned on, then process 700 proceeds to block 715.

At block 715 the process 700 can pause for a period of time T1. The period of time T1 may depend on any number of factors. For example, the period of time T1 can be based on the amount of time controllable device #2 has been on.

The period of time T1 can be chosen, for example, to impose a synchronization of equipment turn-on times throughout the facility. The period of time T1 can depend on any number of factors. In some embodiments, the period of time T1 can depend on how close measurements from an environmental sensor (e.g., temperature, pressure, etc.) are to a setpoint (or upper or lower constraint). For example, if the temperature in a cooler associated with controllable device #1 is above a setpoint, then the period of time T1 can be shorter. For example, if the temperature in a cooler associated with controllable device #2 is above a setpoint, then the period of time T1 can be longer. For example, if the pressure in a pressure vessel associated with controllable device #1 is above a setpoint, then the period of time T2 can be shorter. For instance, if the pressure in a pressure vessel associated with controllable device #2 (or controllable device #3) is above a setpoint, then the period of time T2 can be longer.

In some embodiments, the period of time T1 can depend on whether any activity has occurred in a cooler affected by controllable device #1 or controllable device #2. For example, if new product has recently been placed in a cooler associated with controllable device #1, then the period of time T2 can be short. For example, if new product has recently been placed in a cooler associated with controllable device #2, then the period of time T2 can be longer.

In some embodiments, the period of time T2 may depend on factors discussed in conjunction with other periods of time discussed in this document.

In some embodiments, the period of time T1 can depend on the characteristics of the controllable device #1 or controllable device #2. For example, if controllable device #1 and controllable device #2 are compressors, the period of time T1 may depend on whether controllable device #2 is an early- or late-starting compressor. If controllable device #2, for example, is an early-starting compressor, then period of time T1 can be longer, which should delay the turn on time of controllable device #2. If controllable device #2, for example, is a late-starting compressor, then period of time T1 can be shorter, which should shorten the next turn on time of controllable device #2. These two compressors (or more) can be brought into phase even when the compressors have different turn on characteristics.

In some embodiments, an early-starting, controllable device may be a controllable device that turns on before another controllable device turns off. In some embodiments, a late-starting, controllable device may be a controllable device that turns on a period of time after another controllable device turns off.

In some embodiments, the period of time T1 can depend on the nominal duty cycle of controllable device #1 or controllable device #2.

In some embodiments, the period of time T1 can depend on the current or historical values of various sensors.

In some embodiments, the period of time T1 can depend on the current or historical values of various setpoints provided by a scheduler.

In some embodiments, the period of time T1 can depend on an energy procurement policy (e.g., conditions or prices, which may allow for more or less power variability.

In some embodiments, the period of time T1 can depend on any number of operational constraints such as, for example, a time after which a product is required to be frozen or cooled to a certain temperature.

In some embodiments, the period of time T1 can depend on scheduled electric activity at the facility for other controllable devices.

At block 720 controllable device #2 can be turned off.

At block 725 controllable device #1 can be turned on.

Figure 8:
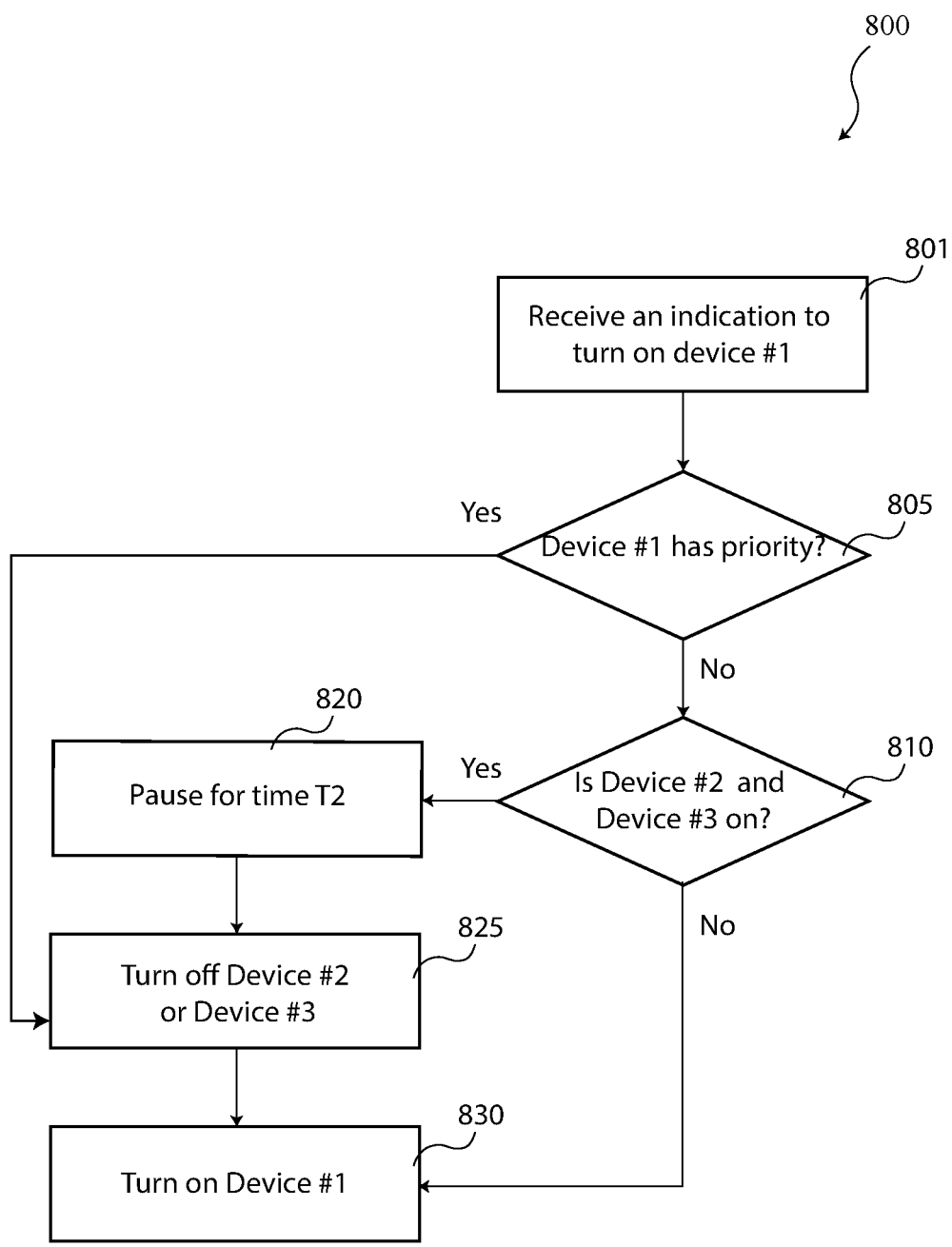
FIG. 8 is a flowchart of an example process for achieving automatic demand stabilization with at least three controllable devices according to some embodiments.

FIG. 8 is a flowchart of an example process 800 of a power draw staggering technique with at least three controllable devices according to some embodiments. The process 800 may include one or more additional blocks. The blocks shown in the process 800 may occur in any order and over any period of time. Any of the blocks shown in the process 800 may be removed, replaced, or may occur in any order.

At block 801, an indication can be received to turn on controllable device #1. The indication, for example, may include an electronic signal or a memory location set in a computational unit that indicates that controllable device #1 should be turned on. The indication, for example, can be received from a scheduler such as, for example, scheduler 105, which may be located remotely (e.g., in the cloud) or at the facility 110.

In some embodiments, the indication can be received by the facility coordinator 115. In some embodiments, the indication can be received by a demand stabilization controller, which may include all, one, or one or more components of computational system 1300.

In some embodiments, the indication, for example, can be received in response to an environmental sensor (e.g., the sensors shown in FIG. 1) setpoint or constraint being hit or passed, or approaching a setpoint or constraint. In response, for example, the facility coordinator may provide an indication that the controllable device #1 should be turned on. In some embodiments, the indication may be an internal signal (e.g., an signal internal to facility coordinator #1) or a variable in memory of a controller.

For example, the temperature within a cooler may be monitored using a temperature sensor 170. If the temperature rises above a setpoint (e.g., greater than 2° C.), then the facility coordinator may indicate that the condenser (e.g., controllable device #1) should be turned on. As another example, if the pressure within a vessel (e.g., vessel 315) rises above a setpoint (e.g., greater than 5% above the setpoint) then the facility coordinator may indicate that the compressor (e.g., controllable device #1) may be turned on.

As another example, the indication can be received in response to an environmental sensor (e.g., a sensor shown in FIG. 1) setpoint being hit or constraint, passed, or approached. In response, for example, the facility coordinator may provide an indication that the controllable device #1 should be turned on. In some embodiments, the indication may be an internal signal (e.g., an signal internal to facility coordinator #1) or a variable in memory of a controller.

As another example, the temperature within a cooler may be monitored using a temperature sensor 170. If the temperature rises above a setpoint (e.g., greater than 2° C.), then the facility coordinator may indicate that the condenser (e.g., controllable device #1) should be turned on. As another example, if the pressure within a vessel (e.g., vessel 315) rises above a setpoint (e.g., greater than 5% above the setpoint) then the facility coordinator may indicate that the compressor (e.g., controllable device #1) may be turned on.

At block 805, the process 800 can determine whether controllable device #1 has priority over controllable device #2. If controllable device #1 has priority over controllable device #2, then process 800 can proceed to block 825. Otherwise, the process 800 can proceed to block 810. In some embodiments, priority may be indicated any number of different ways. For example, a database may include a priority database that lists controllable devices that have priority over other controllable devices. As another example, a controllable device may have priority based on the indication received at block 801. The indication, for example, may indicate that controllable device #1 has priority over other controllable devices.

In some embodiments, neither controllable device #1 nor controllable device #2 may have priority. In some embodiments, if controllable device #2 has priority, then time T1 in block 815 may be longer than otherwise.

At block 810 it can be determined whether both controllable device #2 and controllable device #3 are currently on. For example, controllable device #2 and controllable device #3 can be determined to be on based on the power draw of the respective devices. If neither device is on or one of the two devices is on then process 800 can proceed to block 830, where controllable device #1 is turned on. If both controllable device #2 and controllable device #3 are turned on, then process 800 proceeds to block 820.

At block 820 process 800 can pause for a period of time T2. The period of time T2 can be based on the amount of time either controllable device #2 or controllable device #3 has been on.

The period of time T2 can depend on any number of factors. In some embodiments, the period of time T2 can depend on how close an environmental sensor reading (e.g., temperature, pressure, etc.) is to a setpoint. For example, if the temperature in a cooler associated with controllable device #1 is above a setpoint, then the period of time T2 can be shorter. For example, if the temperature in a cooler associated with controllable device #2 (or controllable device #3) is above a setpoint, then the period of time T2 can be longer. For example, if the pressure in a pressure vessel associated with controllable device #1 is above a setpoint, then the period of time T2 can be shorter. For instance, if the pressure in a pressure vessel associated with controllable device #2 (or controllable device #3) is above a setpoint, then the period of time T2 can be longer.

In some embodiments, the period of time T2 can depend on whether any activity has occurred in a cooler affected by controllable device #1, controllable device #2, or controllable device #3. For example, if new product has recently been placed in a cooler associated with controllable device #1, then the period of time T2 can be short. For example, if new product has recently been placed in a cooler associated with controllable device #2, then the period of time T2 can be longer.

At block 825, one of controllable device #2 or controllable device #3 can be turned off. For example, if both controllable device #2 and controllable device #3 are on, then the device that has be on the longest can be turned off.

At block 830 controllable device #1 can be turned on.

In some embodiments, after block 830 the devices can be incremented so that previous controllable device #1 becomes controllable device #2, previous controllable device #2 becomes controllable device #3, and previous controllable device #3 becomes controllable device #1 and the process 800 can be repeated. In some embodiments, the process 800 can be repeated after waiting a period of time.

Some controllable devices may require a transient large power draw during startup. This startup power draw, for example, can be a significant contributor to demand charges. In some cases, the large startup power draw may only last for a relatively short time (e.g., about 2-20 mins) compared to the duration of the operation of the controllable device (e.g., hours) or less than 1-5% of the total operational time of the controllable device. In some embodiments, proactive startup power stabilization can be used to minimize or lessen power draw spikes that are caused by startup power draw.

In some cases, startup power draw cannot be eliminated. Yet, proactive startup power stabilization can reduce, minimize or lessen the effect of any startup power draw might have on demand charges, for example, by temporarily throttling down other running facility equipment during the short startup power draw. The effect is that when a power surge occurs, proactive startup power stabilization techniques can reduce the remainder of the facility power so that the net power demand can be stable. Proactive startup power stabilization techniques may, for example, only be necessary for a short startup duration. As such, operation of a facility with proactive startup power stabilization techniques may incur negligible performance degradation.

In some embodiments, an implementation of proactive startup power stabilization process can be relatively straightforward. An existing scheduler (e.g., scheduler 105), for example, may produce, provide, or send a power schedule which can be examined by a proactive startup power stabilization module. Whenever the schedule shows a compressor turning on, one or more controllable devices (e.g. fans, pumps, lights, heaters, etc.) can be temporarily turned off or operate at reduce power during the startup time.

By analyzing a schedule, the additional facility power draw needed to turn on a compressor can be known before the compressor is actually turned on. The proactive startup power stabilization module can mathematically calculate a minimum number of other controllable devices that may be temporarily turned off (or turned down) in order to compensate for the required power from turning on the compressor.

In some embodiments, proactive startup power stabilization may keep track of a hierarchy of turned-on equipment (e.g., a priority database), which may order controllable devices by the importance of that device remaining ON without a pause. The proactive startup power stabilization module can choose the fewest number of controllable devices, starting from the least important, the sum of which is greater than the startup power of the controllable device being turned on (e.g., a compressor).

Figure 9:
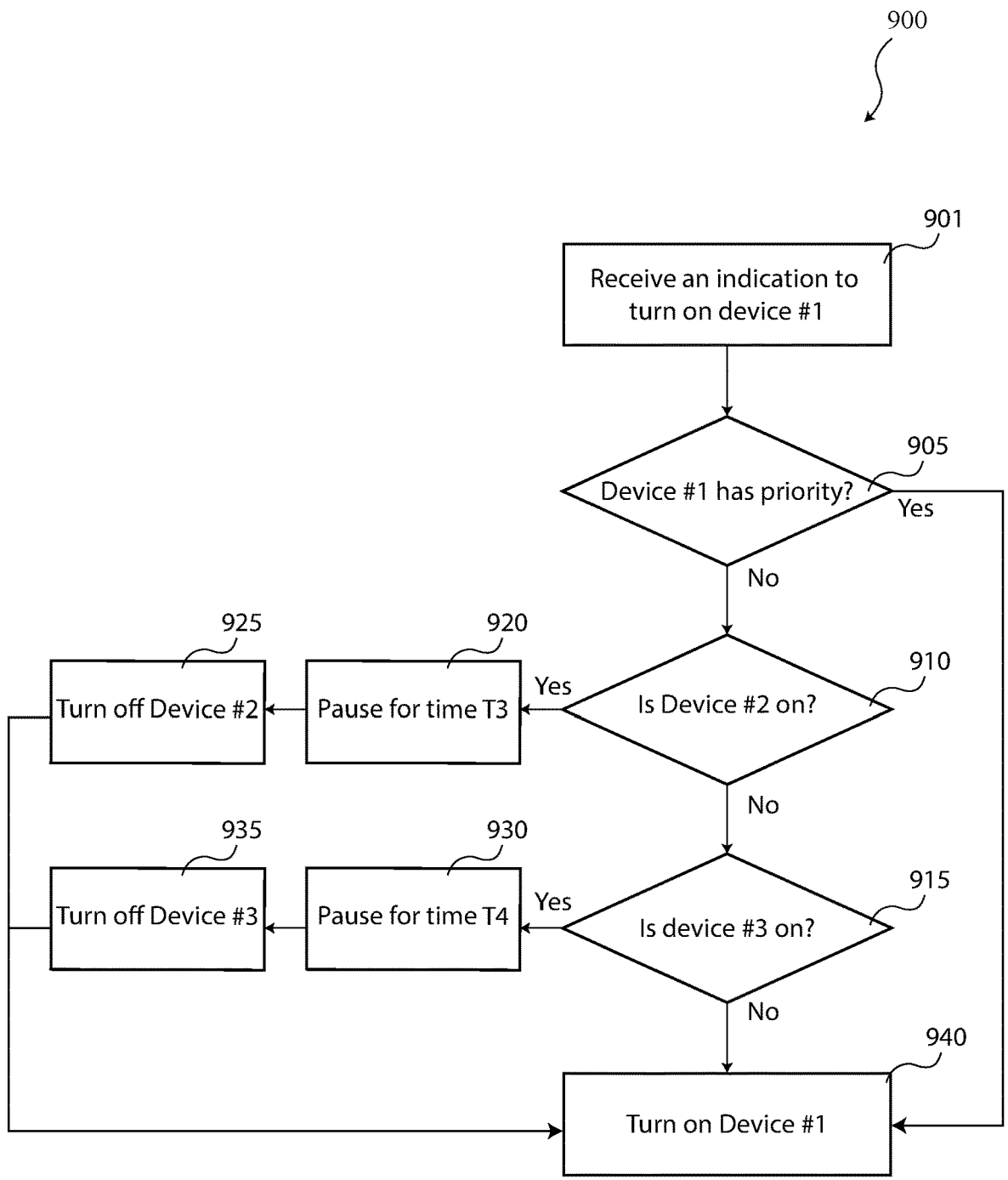
FIG. 9 is a flowchart of an example process of a power draw staggering technique with at least three controllable devices according to some embodiments.

FIG. 9 is a flowchart of an example process 900 of a power draw staggering technique with at least three controllable devices according to some embodiments. The process 900 may include one or more additional blocks. The blocks shown in the process 900 may occur in any order and over any period of time. Any of the blocks shown in the process 900 may be removed, replaced, or may occur in any order. The process 900 may be extended to any number of controllable devices.

At block 901, an indication can be received (e.g., a signal or a memory location set) to turn on controllable device #1. The indication, for example, can be received from a scheduler such as, for example, scheduler 105, which may be located remotely (e.g., in the cloud) or at the facility 110.

In some embodiments, the indication can be received by the facility coordinator 115. In some embodiments, the indication can be received by a demand stabilization controller, which may include all, one, or one or more components of computational system 1300.

In some embodiments, the indication, for example, can be received in response to an environmental sensor (e.g., the sensors shown in FIG. 1) setpoint or constraint being met or passed, or approaching a setpoint or constraint. In response, for example, the facility coordinator may provide an indication that the controllable device #1 should be turned on. In some embodiments, the indication may be an internal signal (e.g., an signal internal to facility coordinator #1) or a variable in memory of a controller.

For example, the temperature within a cooler may be monitored using a temperature sensor 170. If the temperature rises above a setpoint (e.g., greater than 2° C.), then the facility coordinator may indicate that the condenser (e.g., controllable device #1) should be turned on. As another example, if the pressure within a vessel (e.g., vessel 315) rises above a setpoint (e.g., a pressure that is 95% of the maximum vessel pressure) then the facility coordinator may indicate that the compressor (e.g., controllable device #1) may be turned on.

As another example, the indication can be received in response to an environmental sensor (e.g., a sensor shown in FIG. 1) setpoint or constraint being met, passed, or approached. In response, for example, the facility coordinator may provide an indication that the controllable device #1 should be turned on. In some embodiments, the indication may be an internal signal (e.g., an signal internal to facility coordinator #1) or a variable in memory of a controller.

As another example, the temperature within a cooler may be monitored using a temperature sensor 170. If the temperature rises above a setpoint or constraint (e.g., greater than 2° C.), then the facility coordinator may indicate that the condenser (e.g., controllable device #1) should be turned on. As another example, if the pressure within a vessel (e.g., vessel 315) rises above a setpoint or constraint (e.g., a pressure that is 95% of the maximum vessel pressure) then the facility coordinator may indicate that the compressor (e.g., controllable device #1) may be turned on.

At block 905, the process 900 can determine whether controllable device #1 has priority over controllable device #2. If controllable device #1 has priority over controllable device #2, then process 900 can proceed to block 940. Otherwise, the process 900 can proceed to block 910. In some embodiments, priority may be indicated any number of different ways. For example, a database may include a priority database that lists controllable devices that have priority over other controllable devices. As another example, a controllable device may have priority based on the indication received at block 801. The indication, for example, may indicate that controllable device #1 has priority over other controllable devices.

In some embodiments, neither controllable device #1 nor controllable device #2 may have priority. In some embodiments, if controllable device #2 has priority, then time T3 in block 920 may be longer than otherwise. In some embodiments, if controllable device #3 has priority, then time T4 in block 930 may be longer than otherwise.

At block 910 it can be determined whether controllable device #2 is currently on. If controllable device #2 is turned on, then process 900 may proceed to block 920. If controllable device #2 is turned off, then process 900 may proceed to block 915. At block 920, the process 900 may pause for a period of time T3 prior to turning off controllable device #2 at block 925. Then process 900 may proceed to block 940.

In some embodiments, the period of time T3 may depend on factors discussed in conjunction with other periods of time discussed in this document.

At block 915 it can be determined whether both controllable device #3 is currently on. If controllable device #3 is turned on, then process 900 may proceed to block 930. If controllable device #3 is turned off, then process 900 may proceed to block 940 where controllable device #1 is turned on. At block 930, the process 900 may pause for a period of time T4 prior to turning off controllable device #3 at block 935. Then process 900 may proceed to block 940.

In some embodiments, the period of time T4 may depend on factors discussed in conjunction with other periods of time discussed in this document.

Figure 10:
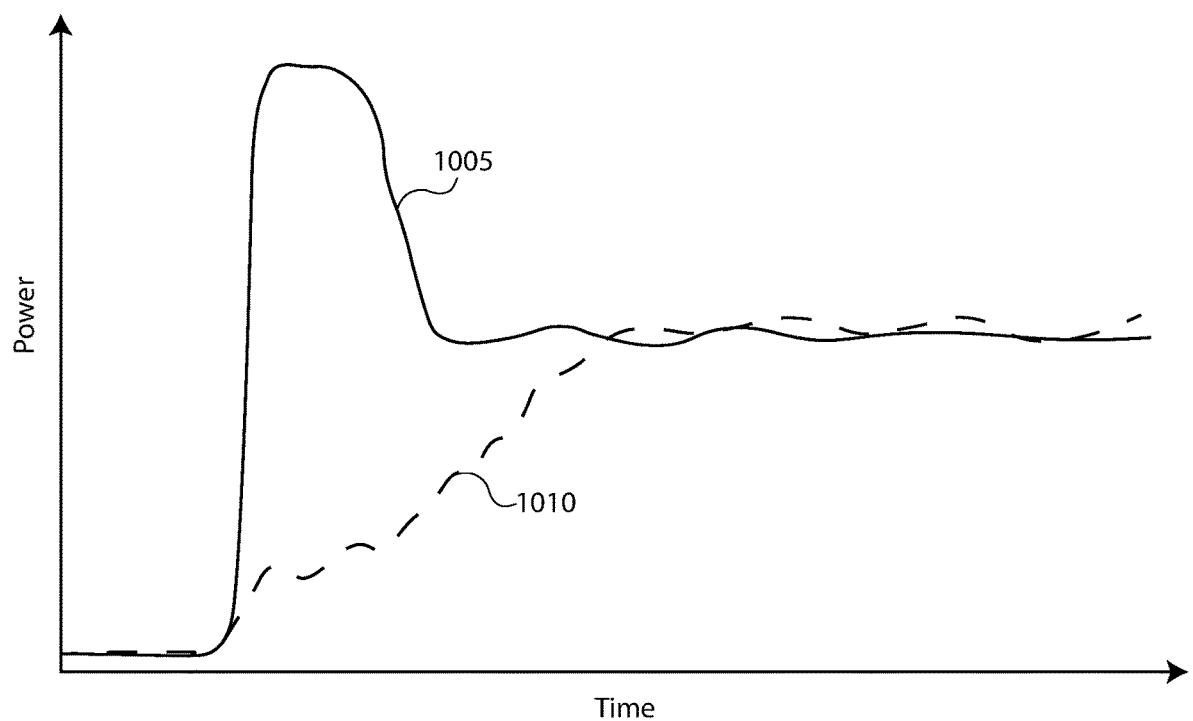
FIG. 10 is a graph showing instantaneous power over time for a controllable device without a variable frequency drive and with a variable frequency drive according to some embodiments.

FIG. 10 is a graph showing instantaneous power over time for a controllable device without a variable frequency drive (trace 1005) and with a variable frequency drive (trace 1010) according to some embodiments. As shown by trace 1005, a controllable device without a variable frequency drive may require more power during a turn on phase or startup phase (e.g., time before steady state) than during steady state. As shown by trace 1010, a controllable device with a variable frequency drive may not require more power during a turn on phase or startup phase (e.g., time before steady state) than during steady state.

Figure 11:
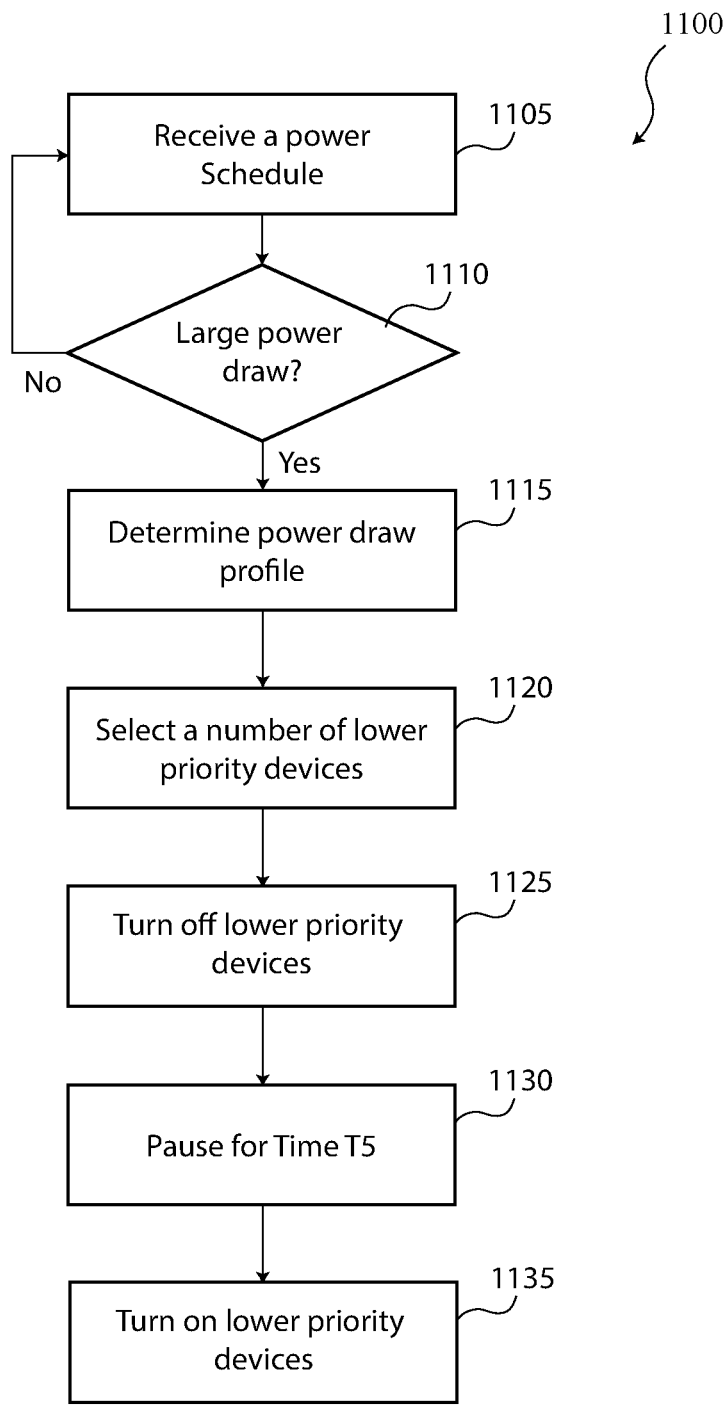
FIG. 11 is a flowchart of an example process for proactive startup power stabilization according to some embodiments.

FIG. 11 is a flowchart of an example process 1100 for proactive startup power stabilization according to some embodiments. The process 1100 may include one or more additional blocks. The blocks shown in the process 1100 may occur in any order and over any period of time. Any of the blocks shown in the process 1100 may be removed, replaced, or may occur in any order.

Process 1100 begins at block 1105. At block 1105 a power schedule can be received, for example, at a facility coordinator. The power schedule, for example, can be received by a scheduler. In some embodiments, the scheduler can be an existing facility computational unit that schedules and programs various controllable devices throughout the facility.

The power schedule may include a schedule for turning on and turning off a plurality of controllable devices. In some embodiments, the facility coordinator may include the scheduler.

At block 1110, a large power draw can be anticipated for a given controllable device based on the power schedule or from an external signal (e.g., see trace 1005 in FIG. 10). For example, a large power draw can be anticipated based on a signal indicating that a cooler has been loaded with warm food. As another example, a large power draw can be anticipated based on projected or predicted weather. As another example, a large power draw can be anticipated based on the number of times the doors to a cooler have been opened or are predicted to be opened or the duration of a door being opened, the physical size of the door, or the temperatures on either side of the door. As another example, a large power draw can be anticipated based on the room temperature approaching the top of a thermostat's dead band.

If a large power draw is not anticipated, then process 1100 proceeds back to block 1105. Otherwise, process moves to block 1115.

At block 1115 a power draw profile for a given controllable device can be determined. In some embodiments, the power draw profile for each controllable device within the facility can be recorded and saved in a database. For example, each time a controllable device is turned powered on, the power consumption of the controllable device over time can be recorded. An average of a number of cycles can be created and saved in a database. The power draw profile can indicate the amount of power required as the controllable device is powered on.

In some embodiments, a total power draw can be determined by adding the maximum power draw from power draw profile to the instantaneous facility draw. In some embodiments, if the total power draw is greater than a power draw constraint (or setpoint), then power stabilization may be required. In some embodiments, if the total power draw is less than a power draw constraint (or setpoint), then power stabilization may not be required.

At block 1120 a plurality of lower profile controllable devices can be selected. A database (see Table 1, for example) can be created that includes all or a subset of all the controllable device within the facility along with each device's ranked priority and each device's steady state power draw. A number of lower priority controllable devices can be selected. The number of controllable devices selected may depend on the large power draw for the given device and the steady state power draw of each of the lower priority controllable devices. In some embodiments, a priority database may be any database and may include other information about other devices.

TABLE 1

Example priority database

| Controllable Device | Priority | Steady state power |
|---|---|---|
| controllable device #1 | 43 | 100 kW |
| controllable device #2 | 44 | 100 kW |
| controllable device #3 | 45 | 200 kW |
| controllable device #4 | 46 | 100 kW |
| controllable device #5 | 47 | 300 kW |
| controllable device #6 | 48 | 200 kW |
| controllable device #7 | 49 | 100 kW |
| controllable device #8 | 50 | 100 kW |

For example, if the power draw profile in block 1115 indicates that 1300 kW of power is required for two minutes as the given controllable device powers up, then at block 1120 the lowest profile controllable devices that have a steady state power draw that sums to 800 kW are selected. In this example, the bottom five controllable devices are selected, which have a total steady state power draw of 800 kW.

As another example, if the power draw profile in block 1115 indicates that 500 kW of power is required for ten minutes as the given controllable device powers up, then at block 1120 the lowest profile controllable devices that have a steady state power draw that sums to 500 kW are selected. In this example, the bottom four controllable devices have a total steady state power draw of 400 kW and the bottom five controllable devices have a total steady state power 700 kW. If needed, in order to meet the power draw requirement, one or more lower profile controllable devices may be ignored. In this example, controllable device #6 can be ignored to allow the steady state power draw to sum to 500 kW. 0

At block 1125, the selected lower profile devices may be turned off.

At block 1130, the process can pause for time T5 that may correspond with the length of the power draw profile for the given controllable device. For example, if the power draw profile expects increased startup power draw to last for five minutes, then time T5 can be five minutes. After time T5, at block 1135 the lower profile devices may be turned back on.

In some embodiments, the period of time T5 may depend on factors discussed in conjunction with other periods of time discussed in this document.

In some embodiments, rather than turning off the lower priority devices in block 1125, the lower priority devices may be operated at a percentage of the total or average power draw for each of the devices. The number of lower priority devices selected in block 1120 will depend on the percentage of power these lower priority devices will operate at.

In some embodiments, the power draw profile determined at block 1115 may be variable. In such circumstances the number of lower priority devices being turned off and turned back on may vary over time in an attempt to match the power draw profile.

In some embodiments, the power draw profile determined at block 1115 may be variable (e.g., see trace 1010 in FIG. 10). In such circumstances the percentage of power supplied to the lower priority devices may vary over time in an attempt to match the power draw profile. For example, the lower priority devices may be turned down a percentage of the total power draw of the lower priority device, where the percentage increases over time until the controllable device reaches steady state.

Various other techniques may be used for proactive startup power stabilization.

For example, a proactive startup power stabilization process can use a PID (proportional-integral-derivative) control algorithm to control the sum of the power of the facility. The setpoint for the PID control algorithm, for example, may be a rolling average of the power draw (e.g., rolling average over the past 10, 30, 60, etc. minutes) of the facility and the actuator for the PID control algorithm, for example, may be the fan speed of one or more fans within a facility (or any metric of any controllable device with a low priority in the priority database). As one or more controllable devices power up and require a large power draw, the PID control algorithm may slow down or speed up the fan speed smooth the total power draw of the facility.

As another example, a bang-bang or MPC control algorithm maybe used in place of the PID control algorithm.

As another example of a proactive startup power stabilization process, the fan speed and power profile for a fan can be known that shows the relationship between the fan speed and the power draw. In addition, a compressor turn-on signature may also be known. A proactive startup power stabilization process can determine the power requirements from the compressor turn-on signature and adjust the fan speed accordingly to minimize the power disturbance from the compressor. The fans may be selected from the priority database as having a low priority such as, for example, based on the amount of acceptable thermal disturbances in the cooler. For example, acceptable thermal disturbances may include coolers with large heat capacities, having current temperature well below the cooler's temperature setpoint, with low heat flux, are able to accept thermal disturbances (lack of cooling) better than those that do not have these properties, etc.

These example proactive startup power stabilization processes are not limited to the fan speeds as the secondary equipment and compressors as the heavy-load or primary equipment. Additional primary or secondary equipment may include, for example, pumps, lights, underfloor heaters, battery chargers, high pressure pasteurization units, compressors, motors, shredders, grinders, furnaces, etc.

Some embodiments may include projection based power stabilization. In some embodiments, a physical model of a facility can be developed that projects how much power may be used by the facility at a given time in the future. This projection, for example, may predict undesirable power spikes, which may be useful for systems where a change in actuator state affects the net power use after some known delayed response.

In some embodiments, a change in the state of one or more controllable devices may produce an increased power draw, possibly after a delay. The facility coordinator, for example, can monitor the total power draw of the facility over time. A power draw model can be developed that correlates increased power draws in response to changes in the state of one or more controllable devices. For example, the facility coordinator may monitor the power draw of the facility, a subset of related controllable devices, or each controllable device and note times when the power draw increased or spiked. The facility coordinator may also record the state of each controllable device in the facility. A model may be developed that correlates a state change of a controllable device with a power draw increase and the time delay, if any, between the state change and the power draw.

The facility coordinator, for example, may proactively turn the power of one or more controllable devices off or down based on a predicted power spike or increase in order to smooth the power draw as described above in conjunction with the proactive startup power stabilization process but doing so based on power increases that are predicted or anticipated rather than those that are necessarily part of a controllable devices startup.

For example, a facility coordinator may determine that an evaporator fan produces an increase in compressor power-draw or total power draw five minutes after the evaporator fan is turned on. For instance, the facility coordinator may record a time-series of data defining the state (e.g., on/off or fan speed) of the fan over time and data defining the power draw of the facility over time. This data may be stored, for example, in memory. A model can be built that associates the fan state with the power draw and any time delay between the two. When the fan's state changes, then the facility coordinator will know that a power draw event will occur and may decrease the power draw of one or more other controllable devices (e.g., based on the priority database) by an amount substantially equally to the anticipated power draw at the anticipated time.

In some embodiments, a control-system approach may be used such as, for example, when a facility model may not be available. In some embodiments, automatic demand stabilization processes can smooth short time-scale power fluctuations (e.g., short time-scale are timescales of about 1, 2, 5, 10, etc. minutes). In some embodiments, long-term power management can be managed by other processes or systems such as, for example, the scheduler. While automatic demand stabilization process may not have control over the average power usage above the short time-scale, all of its control falls in the time-scales below the short time-scale. For example, automatic demand stabilization processes can smooth power draw by budgeting the power difference between the short time-scale rolling average and the instantaneous power draw. This difference in power is the power budget that can be divvied out to other equipment in the facility. When the power budget is positive, for example, the facility is instantaneously using less power than it has been in recent history and equipment should draw more power to compensate. Conversely, when the power budget is negative, for example, the facility is using too much power (relative to recent history), and automatic demand stabilization processes can reduce equipment power draw across the facility. In some embodiments, a control system (e.g. a PID loop) can be used to control the total facility power by defining the short time-scale of total facility power as the setpoint. The result can be a facility whose power draw is substantially smooth.

In some embodiments, all equipment in a facility can take the power budget as input so that when instantaneous power is higher than the rolling average, components in the facility may err on the side of using less power than they would otherwise. In some embodiments, this can create a cooperative emergent system in which each component knows about how much energy the entire facility is using and knows how to cooperate in maintaining a steady power usage.

In some embodiments, the power draw of controllable device #1 may have a power setpoint. A power stabilization method may create a power budget, which is the difference of the sum of all the power being used instantaneously ($P_{inst}$) by the facility and the moving average power ($P_{ave}$). If the power budget is positive (e.g., $P_{inst} > P_{ave}$) then power budget can be decreased by decreasing the power to one or more controllable devices in order to attempt to bring the sum of all the power being used instantaneously in line with the moving average power.

For example, if a facility has an average power ($P_{ave}$) of 5,000 kW and two compressors are switched on such that the instantons power ($P_{inst}$) is 5,400 kW. This results in a positive power budget (e.g., 5,400 kW-5,000 kW=400 kw). In response, one or more lower priority devices may be turned off or turned down to compensate for this increase in the instantons power.

Figure 12:
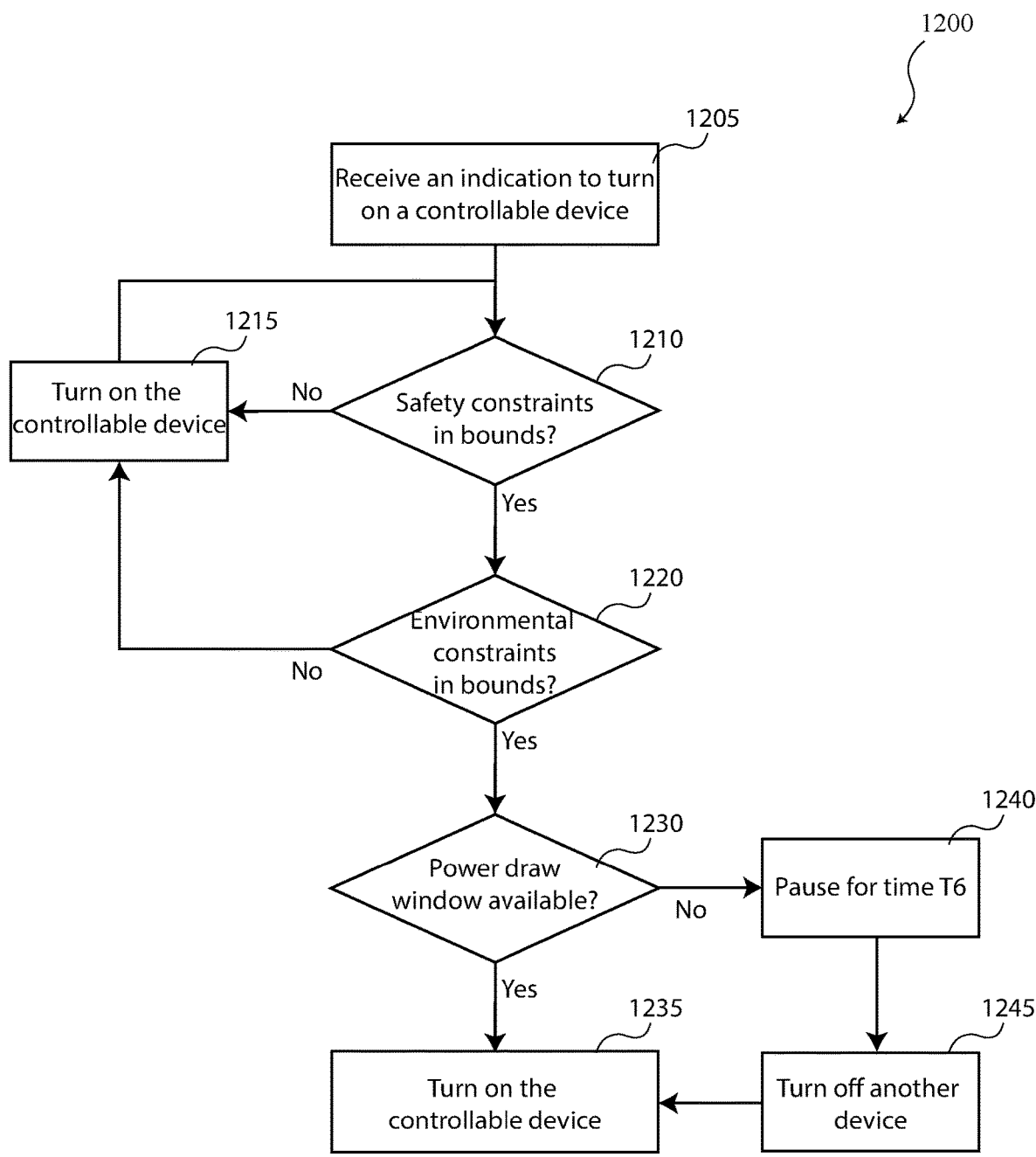
FIG. 12 is a flowchart of an example process for achieving automatic demand stabilization according to some embodiments.

FIG. 12 is a flowchart of an example process 1200 for achieving automatic demand stabilization according to some embodiments. The process 1200 may include one or more additional blocks. The blocks shown in the process 1200 may occur in any order and over any period of time. Any of the blocks shown in the process 1200 may be removed, replaced, or may occur in any order.

At block 1205, an indication can be received (e.g., a signal or a memory location set) to turn on controllable device #1.

The indication, for example, can be received from a scheduler such as, for example, scheduler 105, which may be located remotely (e.g., in the cloud) or at the facility 110.

In some embodiments, the indication can be received by the facility coordinator 115. In some embodiments, the indication can be received by a demand stabilization controller, which may include all, one, or one or more components of computational system 1300.

At block 1210 the process 1200 can determine whether safety (or physical) constraints are within bounds or whether a safety constraint has a sufficient probability of going out of bounds.

Physical constraints may include the maximum fan speed, the maximum vessel level, minimum compressor speed, or minimum compressor temperature, etc. Under a corrective action, these constraints may have the highest priority for ensuring that these bounds are held within the bounds defined by the constraints. Safety constraints may include vessel pressure constraints (e.g., a maximum vessel pressure), compressor oil pressure constraint (e.g., a maximum vessel pressure), and room ammonia (or any other refrigerant) concentration level.

If a safety constraint is out of bounds or approaching a bound, then the process 1200 can proceed to block 1215 where the controllable device is turned on. In some embodiments, the controllable device may be turned on for a period of time T5. The period of time T5, for example, may be a predetermined period of time such as, for example, 5, 10, 15, 20, or 30 minutes. The period of time T5, for example, may also depend on the operational history of the facility or the controllable device or the controllable device and how long it has historically taken for the safety constraint to be brought into bounds. After the pause, the process 1200 returns to block 1210. The process 1200 may loop between blocks 1210 and 1215 until the safety constraints are within bounds.

The safety constraint may be any or all safety constraints directly or indirectly related to any or all controllable device within the facility such as, for example, controllable device #1.

If the safety constraint(s) are in bound(s), then process 1200 can proceed to block 1220.

At block 1220 the process 1200 can determine whether a one or more environmental (or operational) constraint is within bounds or whether one or more environmental constraints has a sufficient probability of going out of bounds.

If an environmental constraint is out of bounds or approaching a bound, then the process 1200 can proceed to block 1215 where and the controllable device is turned on. In some embodiments, the controllable device may be turned on for a period of time T6, for example, may be a predetermined period of time such as, for example, 5, 10, 15, 20, or 30 minutes. The period of time T6, for example, may also depend on the operational history of the facility or the controllable device and how long it has historically taken for the environmental constraint to be brought into bounds. After the pause, the process 1200 can returns to block 1210 (or 1220). The process 1200 may loop between blocks 1220 and/or 1210 until the safety constraints are within bounds.

In some embodiments, the period of time T6 may depend on factors discussed in conjunction with other periods of time discussed in this document.

An environmental constraint, for example, may include a maximum temperature, a minimum temperature, a maximum humidity, a minimum humidity, maximum pressure, minimum pressure, lights on/off, etc. In some embodiments, an environmental constraint may be specific to a facility, a subsection of a facility, or a given room within a facility. In some embodiments, an environmental constraint may depend on a product, a product family, or a product type.

An operational constraint, for example, may include any type of constraint related to operations, or constraints that are not environmental constraints or equipment constraints. An operational constraint, for example, may include a constraint to periodically defrost certain pipes, lower the fan speeds during certain hours, lower or turn off the fans when a door is open or within a time period of being opened, quickly freeze certain items within a certain period of time, lights on time, lights off time, etc. Operational constraints, for example, may include time-based constraints.

An environmental constraint may include the temperature within a cooler.

The environmental constraint may or may not be environmental constraints directly or indirectly related to any or all controllable device within the facility such as, for example, controllable device #1.

If the environmental constraint(s) are in bound(s), then the process 1200 can proceed to block 1230. At 1230 the process 1200 can determine whether a power draw window is available. A power draw window, for example, can include whether a combination of one or more other controllable devices are currently on. If a power draw window isn't available then the process 1200 can proceed to block 1240 where the process 1200 pauses for time period T6. The time period T6, for example, may depend on the time until a power draw window is available.

If a power draw window is available, then the process 1200 may proceed to block 1235 and the controllable device is turned on.

After a pause for the time period T6, the process 1200 can proceed to block 1245 where another controllable device is turned off. Then the process 1200 can proceed to block 1235 where the controllable device is turned on.

For example, process 1200 can be used to stabilize the power demand at a facility that includes three compressors (e.g., as shown in FIG. 6). At block 1205 an indication can be received that a first compressor, which is currently off, should be turned on. If the safety (or a physical) and the environmental (or operational) constraint are within bounds at blocks 1210 and 1220, then at block 1230 the process 1200 can be determine if a power draw window is available or will be available. A power draw window, for example, may be available if one of the other two controllable devices are not turned on. For example, as shown in FIG. 6, at time t1 controllable device #2 and controllable device #3 are both on; no power draw window is available. Process 1200 then proceeds to block 1240 and pauses for a time T6, which may be the difference between time t1 and t2 or some fraction thereof. At time t2 the controllable device #3 is turning off or scheduled to turn off, resulting in an available power draw window. At time t2, controllable device #3 may be turned off at block 1245 and/or at block 1235 controllable device #1 can be turned on.

In some embodiments, blocks 1210, 1215, or 1220 may proceed other process or methods described in this document. For example, these blocks may proceed processes 500, 700, 800, 900, 1100, or 1200.

The computational system 1300, shown in FIG. 13 can be used to perform any of the embodiments of the invention. For example, computational system 1300 can be used to execute processes 500, 700, 800, 1100, and/or 1200. As another example, computational system 1300 can be used perform any calculation, identification and/or determination described here. Computational system 1300 includes hardware elements that can be electrically coupled via a bus 1305 (or may otherwise be in communication, as appropriate). The hardware elements can include one or more processors 1310, including without limitation one or more general-purpose processors and/or one or more special-purpose processors (such as digital signal processing chips, graphics acceleration chips, and/or the like); one or more input devices 1315, which can include without limitation a mouse, a keyboard and/or the like; and one or more output devices 1320, which can include without limitation a display device, a printer and/or the like.

The computational system 1300 may further include (and/or be in communication with) one or more storage devices 1325, which can include, without limitation, local and/or network accessible storage and/or can include, without limitation, a disk drive, a drive array, an optical storage device, a solid-state storage device, such as a random access memory ("RAM") and/or a read-only memory ("ROM"), which can be programmable, flash-updateable and/or the like. The computational system 1300 might also include a communications subsystem 1330, which can include without limitation a modem, a network card (wireless or wired), an infrared communication device, a wireless communication device and/or chipset (such as a Bluetooth device, an 802.6 device, a Wi-Fi device, a WiMax device, cellular communication facilities, etc.), and/or the like. The communications subsystem 1330 may permit data to be exchanged with a network (such as the network described below, to name one example), and/or any other devices described herein. In many embodiments, the computational system 1300 will further include a working memory 1335, which can include a RAM or ROM device, as described above.

The computational system 1300 also can include software elements, shown as being currently located within the working memory 1335, including an operating system 1340 and/or other code, such as one or more application programs 1345, which may include computer programs of the invention, and/or may be designed to implement methods of the invention and/or configure systems of the invention, as described herein. For example, one or more procedures described with respect to the method(s) discussed above might be implemented as code and/or instructions executable by a computer (and/or a processor within a computer). A set of these instructions and/or codes might be stored on a computer-readable storage medium, such as the storage device(s) 1325 described above.

In some cases, the storage medium might be incorporated within the computational system 1300 or in communication with the computational system 1300. In other embodiments, the storage medium might be separate from a computational system 1300 (e.g., a removable medium, such as a compact disc, etc.), and/or provided in an installation package, such that the storage medium can be used to program a general-purpose computer with the instructions/code stored thereon. These instructions might take the form of executable code, which is executable by the computational system 1300 and/or might take the form of source and/or installable code, which, upon compilation and/or installation on the computational system 1300 (e.g., using any of a variety of generally available compilers, installation programs, compression/decompression utilities, etc.) then takes the form of executable code.

Unless otherwise specified, the term "substantially" means within 5% or 10% of the value referred to or within manufacturing tolerances. Unless otherwise specified, the term "about" means within 5% or 10% of the value referred to or within manufacturing tolerances.

The conjunction "or" is inclusive.

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A system with electric power demand stabilization comprising:
    a plurality of controllable devices within an industrial cold storage facility, wherein the plurality of controllable devices comprises two or more different controllable devices selected from the group consisting of a motor, fan, turbine, valve, refrigerant vessel, evaporator, condenser, compressor, underfloor heating element, defrost equipment, and centrifuge, wherein each controllable device of the plurality of controllable devices is disposed within the industrial cold storage facility;
    a plurality of environmental sensors configured to measure aspects of the industrial cold storage facility environment; and
    a facility coordinator in communication with the plurality of controllable devices and the plurality of environmental sensors, the facility coordinator is configured to:
        measure a power draw of the plurality of controllable devices over a period of time using one or more of the plurality of environmental sensors;
        determine a rolling average power draw for the plurality of controllable devices over the period of time;
        measure an instantaneous power draw of the plurality of controllable devices using one or more of the plurality of environmental sensors, wherein the instantaneous power draw of the plurality of controllable devices is estimated based at least in part on the on and off states of the plurality of controllable devices;
        calculate a power budget comprising the difference between the instantaneous power draw and the rolling average power draw;
        in the event the power budget is positive, increase power to at least a first subset of the plurality of controllable devices, wherein the first subset of the plurality of controllable devices includes fewer than the plurality of controllable devices and wherein the first subset of the plurality of controllable devices comprises at least one of a motor, fan, turbine, valve, refrigerant vessel, evaporator, condenser, compressor, underfloor heating element, defrost equipment, and centrifuge; and
        in the event the power budget is negative, decrease power to at least a second subset of the plurality of controllable devices, wherein the second subset of the plurality of controllable devices includes fewer than the plurality of controllable devices and wherein the second subset of the plurality of controllable devices comprises at least one of a motor, fan, turbine, valve, refrigerant vessel, evaporator, condenser, compressor, underfloor heating element, defrost equipment, and centrifuge.

2. The system according to claim 1, wherein the period of time is between 30 minutes and four hours.

3. The system according to claim 1, wherein the first subset of the plurality of controllable devices comprises one or more higher priority controllable devices of the plurality of controllable devices.

4. The system according to claim 3, wherein the one or more higher priority controllable devices are selected from a priority database that prioritizes the plurality of controllable devices based on each controllable device's priority relative to the other controllable devices in the plurality of controllable devices.

5. The system according to claim 1, wherein the second subset of the plurality of controllable devices comprises one or more lower priority controllable devices of the plurality of controllable devices.

6. The system according to claim 5, wherein the one or more lower priority controllable devices are selected from a priority database that prioritizes the plurality of controllable devices based on each controllable devices priority relative to the other controllable devices in the plurality of controllable devices.

7. The system according to claim 1, wherein the instantaneous power draw of plurality of controllable device is measured using a CT clamp sensor.

8. An electric power demand stabilization method comprising:
    measuring a power draw of a plurality of controllable devices within an industrial cold storage facility, wherein the plurality of controllable devices comprises two or more different controllable devices selected from the group consisting of a motor, fan, turbine, valve, refrigerant vessel, evaporator, condenser, compressor, underfloor heating element, lighting, defrost equipment, centrifuge, and furnace, wherein each controllable device of the plurality of controllable devices is disposed within the industrial cold storage facility;
    determining a rolling average power draw for the plurality of controllable devices over a period of time;
    measuring an instantaneous power draw of the plurality of controllable devices over the period of time, wherein the instantaneous power draw of the plurality of controllable devices is estimated based at least in part on the on and off states of the plurality of controllable devices;
    calculating a power budget comprising the difference between the instantaneous power draw and the rolling average power draw;
    in the event the power budget is positive, increasing power to at least a first subset of the plurality of controllable devices, wherein the first subset of the plurality of controllable devices includes fewer than the plurality of controllable devices and wherein the first subset of the plurality of controllable devices comprises at least one of a motor, fan, turbine, valve, refrigerant vessel, evaporator, condenser, compressor, underfloor heating element, defrost equipment, and centrifuge; and
    in the event the power budget is negative, decreasing power to at least a second subset of the plurality of controllable devices, wherein the second subset of the plurality of controllable devices includes fewer than the plurality of controllable devices and wherein the second subset of the plurality of controllable devices comprises at least one of a motor, fan, turbine, valve, refrigerant vessel, evaporator, condenser, compressor, underfloor heating element, defrost equipment, and centrifuge.

9. The electric power demand stabilization method according to claim 8, wherein the first subset of the plurality of controllable devices comprises one or more higher priority controllable devices of the plurality of controllable devices.

10. The electric power demand stabilization method according to claim 9, wherein the one or more higher priority controllable devices are selected from a priority database that prioritizes the plurality of controllable devices based on each controllable device's priority relative to the other controllable devices in the plurality of controllable devices.

11. The electric power demand stabilization method according to claim 8, wherein the second subset of the plurality of controllable devices comprises one or more lower priority controllable devices of the plurality of controllable devices.

12. The electric power demand stabilization method according to claim 11, wherein the one or more lower priority controllable devices are selected from a priority database that prioritizes the plurality of controllable devices based on each controllable devices priority relative to the other controllable devices in the plurality of controllable devices.

13. The electric power demand stabilization method according to claim 8, wherein the power draw of plurality of controllable device is measured using a CT clamp sensor.

* * * * *